(12) United States Patent
Visco et al.

(10) Patent No.: US 8,673,477 B2
(45) Date of Patent: *Mar. 18, 2014

(54) HIGH ENERGY DENSITY AQUEOUS LITHIUM/AIR-BATTERY CELLS

(75) Inventors: Steven J. Visco, Berkeley, CA (US); Lutgard C. De Jonghe, Lafayette, CA (US); Yevgeniy S. Nimon, Danville, CA (US); Alexei Petrov, Walnut Creek, CA (US); Kirill Pridatko, Walnut Creek, CA (US); Bruce Katz, Moraga, CA (US)

(73) Assignee: PolyPlus Battery Company, Berkeley, CA (US)

( * ) Notice: Subject to any disclaimer, the term of this patent is extended or adjusted under 35 U.S.C. 154(b) by 746 days.

This patent is subject to a terminal disclaimer.

(21) Appl. No.: 12/484,065

(22) Filed: Jun. 12, 2009

(65) Prior Publication Data

US 2009/0311603 A1 Dec. 17, 2009

Related U.S. Application Data

(60) Provisional application No. 61/061,972, filed on Jun. 16, 2008, provisional application No. 61/078,294, filed on Jul. 3, 2008, provisional application No. 61/159,786, filed on Mar. 12, 2009.

(51) Int. Cl.
| | |
|---|---|
| *H01M 10/12* | (2006.01) |
| *H01M 6/04* | (2006.01) |
| *H01M 4/36* | (2006.01) |
| *H01M 6/24* | (2006.01) |
| *H01M 4/13* | (2010.01) |
| *H01M 4/58* | (2010.01) |

(52) U.S. Cl.
USPC ........... 429/126; 429/101; 429/199; 429/201; 429/231.95

(58) Field of Classification Search
USPC ............... 429/126, 231.95, 101, 199, 201
See application file for complete search history.

(56) References Cited

U.S. PATENT DOCUMENTS

| | | | |
|---|---|---|---|
| 3,528,856 | A | 9/1970 | Ovshinsky |
| 3,607,417 | A | 9/1971 | McRae et al. |
| 3,615,835 | A | 10/1971 | Ovshinsky |
| 3,625,769 | A | 12/1971 | Lyall |
| 3,703,415 | A | 11/1972 | Mitoff et al. |
| 3,783,026 | A | 1/1974 | Kordesch |

(Continued)

FOREIGN PATENT DOCUMENTS

| | | |
|---|---|---|
| EP | 0111214 | 11/1983 |
| EP | 0694501 | 1/1996 |

(Continued)

OTHER PUBLICATIONS

EP patent application No. 04794655.3, Examination Report mailed Apr. 22, 2010.

(Continued)

*Primary Examiner* — Patrick Ryan
*Assistant Examiner* — Julian Anthony
(74) *Attorney, Agent, or Firm* — Weaver Austin Villeneuve & Sampson LLP

(57) ABSTRACT

Li/air battery cells are configurable to achieve very high energy density. The cells include a protected a lithium metal or alloy anode and an aqueous catholyte in a cathode compartment. In addition to the aqueous catholyte, components of the cathode compartment include an air cathode (e.g., oxygen electrode) and a variety of other possible elements.

49 Claims, 12 Drawing Sheets

(56) References Cited

U.S. PATENT DOCUMENTS

| | | |
|---|---|---|
| 3,912,536 A | 10/1975 | Galli et al. |
| 3,976,509 A | 8/1976 | Tsai et al. |
| 4,007,057 A | 2/1977 | Littauer et al. |
| 4,091,182 A | 5/1978 | Farrington et al. |
| 4,162,202 A | 7/1979 | Dey |
| 4,163,084 A | 7/1979 | Tsai et al. |
| 4,210,707 A | 7/1980 | Farrington |
| 4,248,682 A | 2/1981 | Lindstrom et al. |
| 4,402,995 A | 9/1983 | Fleischer |
| 4,405,416 A | 9/1983 | Raistrick et al. |
| 4,414,293 A | 11/1983 | Joy et al. |
| 4,504,561 A | 3/1985 | Winsel |
| 4,833,048 A | 5/1989 | De Jonghe et al. |
| 4,916,036 A | 4/1990 | Cheiky |
| 4,917,974 A | 4/1990 | Visco et al. |
| 4,981,672 A | 1/1991 | De Neufville et al. |
| 4,985,317 A | 1/1991 | Adachi et al. |
| 5,035,963 A | 7/1991 | Plichta |
| 5,100,523 A | 3/1992 | Helms et al. |
| 5,108,856 A | 4/1992 | Shuster |
| 5,162,175 A | 11/1992 | De Jonghe et al. |
| 5,166,011 A | 11/1992 | Rao et al. |
| 5,198,081 A | 3/1993 | Kanoh et al. |
| 5,213,908 A | 5/1993 | Hagedorn |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,582,623 A | 12/1996 | Chu |
| 5,597,660 A | 1/1997 | Bates et al. |
| 5,612,152 A | 3/1997 | Bates |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,693,212 A | 12/1997 | Mazanec et al. |
| 5,696,201 A | 12/1997 | Cavalloni et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Jonghe et al. |
| 5,961,672 A | 10/1999 | Skotheim et al. |
| 6,017,651 A | 1/2000 | Chu et al. |
| 6,025,094 A | 2/2000 | Visco et al. |
| 6,030,720 A | 2/2000 | Chu et al. |
| 6,030,909 A | 2/2000 | Fu |
| 6,066,417 A | 5/2000 | Cho et al. |
| 6,068,950 A | 5/2000 | Gan et al. |
| 6,096,447 A | 8/2000 | Gan et al. |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan et al. |
| 6,200,704 B1 | 3/2001 | De Jonghe et al. |
| 6,203,942 B1 | 3/2001 | Gan et al. |
| 6,210,832 B1 | 4/2001 | Chu et al. |
| 6,214,061 B1 | 4/2001 | Visco et al. |
| 6,225,002 B1 | 5/2001 | Chu et al. |
| 6,228,527 B1 | 5/2001 | Medeiros et al. |
| 6,248,481 B1 | 6/2001 | De Jonghe et al. |
| 6,274,269 B1 | 8/2001 | Gan et al. |
| 6,280,598 B1 | 8/2001 | Barton et al. |
| 6,296,958 B1 | 10/2001 | Pinto et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | De Jonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,829,212 B2 | 11/2010 | Visco et al. |
| 8,048,571 B2 | 11/2011 | Visco et al. |
| 8,182,943 B2 | 5/2012 | Visco et al. |
| 8,323,820 B2 | 12/2012 | Visco et al. |
| 8,334,075 B2 | 12/2012 | Visco et al. |
| 8,455,131 B2 | 6/2013 | Visco et al. |
| 2001/0014420 A1 | 8/2001 | Takeuchi et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0034688 A1 | 3/2002 | Chu et al. |
| 2002/0068220 A1 | 6/2002 | Wyler |
| 2002/0102465 A1 | 8/2002 | Chen et al. |
| 2002/0106563 A1 | 8/2002 | Okawa |
| 2003/0124433 A1 | 7/2003 | Kim |
| 2004/0126653 A1 | 7/2004 | Visco et al. |
| 2004/0142244 A1 | 7/2004 | Visco et al. |
| 2004/0185334 A1 | 9/2004 | Imamoto |
| 2004/0191617 A1 | 9/2004 | Visco et al. |
| 2004/0197641 A1 | 10/2004 | Visco et al. |
| 2005/0100792 A1 | 5/2005 | Visco et al. |
| 2005/0100793 A1 | 5/2005 | Jonghe et al. |
| 2005/0175894 A1 | 8/2005 | Visco et al. |
| 2005/0186469 A1 | 8/2005 | De Jonghe et al. |
| 2005/0208353 A1 | 9/2005 | Johnson |
| 2006/0063051 A1 | 3/2006 | Jang |
| 2006/0078790 A1 | 4/2006 | Nimon et al. |
| 2006/0183011 A1 | 8/2006 | Mittelsteadt et al. |
| 2007/0037058 A1 | 2/2007 | Visco et al. |
| 2007/0051620 A1 | 3/2007 | Visco et al. |
| 2007/0087269 A1 | 4/2007 | Inda |
| 2007/0117026 A1 | 5/2007 | Kumar et al. |
| 2007/0172739 A1 | 7/2007 | Visco et al. |
| 2007/0231704 A1 | 10/2007 | Inda |
| 2011/0014522 A1 | 1/2011 | Visco et al. |
| 2012/0009469 A1 | 1/2012 | Visco et al. |

(56) References Cited

U.S. PATENT DOCUMENTS

FOREIGN PATENT DOCUMENTS

| EP | 0838441 | 4/1998 |
|---|---|---|
| EP | 0875951 | 11/1998 |
| EP | 0689260 | 4/1999 |
| EP | 1162675 | 12/2001 |
| EP | 1892780 | 2/2008 |
| JP | 55-081471 | 6/1980 |
| JP | 62-243247 | 10/1987 |
| JP | 09-320645 | 12/1997 |
| KR | 10-2001-0024927 | 3/2001 |
| WO | 98/28811 | 7/1998 |
| WO | 99/57770 | 11/1999 |
| WO | 02/50933 | 6/2002 |
| WO | 2005/038953 | 4/2005 |
| WO | 2005/038962 | 4/2005 |
| WO | WO 2005/083829 | 9/2005 |
| WO | 2007/021717 | 2/2007 |

OTHER PUBLICATIONS

Visco, S.J. et al., "Lithium-Air", Encyclopedia of Electrochemical Power Sources, Dyer (editor), Elsevier, 2009, ISBN: 9780444527455, pp. 376-383.
U.S. Appl. No. 10/824,944, Notice of Allowance mailed Jul. 31, 2007.
U.S. Appl. No. 10/772,157, Notice of Allowance mailed Sep. 17, 2009.
U.S. Appl. No. 11/824,548, Notice of Allowance mailed Dec. 17, 2009.
U.S. Appl. No. 12/649,245, Office Action mailed Jul. 19, 2010.
U.S. Appl. No. 12/649,245, Office Action mailed Nov. 30, 2010.
U.S. Appl. No. 12/649,245, Office Action mailed May 2, 2011.
U.S. Appl. No. 12/649,245, Notice of Allowance mailed Sep. 14, 2011.
U.S. Appl. No. 11/824,597, Notice of Allowance mailed Sep. 9, 2010.
U.S. Appl. No. 11/612,741, Office Action mailed Nov. 29, 2010.
U.S. Appl. No. 11/612,741, Office Action mailed Jul. 22, 2011.
U.S. Appl. No. 11/612,741, Notice of Allowance mailed Feb. 3, 2012.
AU patent application No. 2004306866, Notice of Acceptance mailed Jun. 17, 2010.
CA patent application No. 2,542,304, Examination Report mailed Apr. 4, 2011.
CN patent application No. 200480037293.5, Office Action mailed Jan. 29, 2010.
CN patent application No. 200480037293.5, Office Action mailed Jun. 24, 2010.
JP patent application No. 2006-535572, Office Action mailed Jun. 21, 2011.
KR patent application No. 2006-7007309, Office Action mailed Jul. 27, 2011.
CA patent application No. 2,555,637, Exam Report mailed May 10, 2011.
CN patent application No. 200910174918.7, Office Action mailed Oct. 19, 2011.
JP patent application No. 2006-552102, Office Action mailed Jul. 5, 2011.
KR patent application No. 10-2006-7017692, Notice to Submit Response mailed May 13, 2011.
U.S. Appl. No. 12/484,063, Office Action mailed Feb. 6, 2012.
International Search Report and Written Opinion dated Oct. 18, 2005 from International Application No. PCT/US2004/033372.
De Jonghe et al., "Chemical Protection of a Lithium Surface", PolyPlus Battery Company, U.S. Appl. No. 11/092,781, filed Mar. 28, 2005, pp. 1-34.
U.S. Appl. No. 11/092,781, Office Action mailed Jun. 16, 2006.
U.S. Appl. No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 10/986,441, Office Action mailed Oct. 20, 2008.
U.S. Appl. No. 11/823,847, "Ionically conductive composites for protection of active metal anodes", Visco et al., filed Jun. 27, 2007.
U.S. Appl. No. 11/823,847, Office Action mailed Sep. 16, 2008.
U.S. Appl. No. 11/823,847, Office Action mailed Apr. 28, 2009.
U.S. Appl. No. 12/649,245, "Active metal / aqueous electrochemical cells and systems", Visco et al., filed Dec. 29, 2009.
U.S. Appl. No. 12/649,245, Office Action mailed Mar. 31, 2010.
U.S. Appl. No. 11/824,574, "Ionically conductive membranes for protection of active metal andoes and battery cells", Visco et al., filed Jun. 29, 2007.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, *Solid State Ionics*.
J.B. Bates, et al., "Thin-film rechargeable lithium batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in Li2O—Al2O3—TiO2—SiO2—P2O5 Glass-Ceramics", Journal of the American Ceramics Society, vol. 80, No. 7, Jul. 1997, pp. 1-5.
Aono et al., "Ionic Conductivity of the Lithium Titanium Phosphate ($Li_{1+x}M_xTi_{2-x}(PO_4)_3$, M=Al, Sc, Y, and La) Systems", Dept. of Industrial Chemistry, pp. 590-591.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of β=$Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O$—$Al_2O_3$—$TiO_3$—$P_2O_5$", Solid State Ionics, 96 (1997), pp. 195-200.
Fu, Jie, "Fast Li+ ion conducting glass-ceramics in the system $Li_2O$—$Al_2O_3$—$GeO_2$—$P_2O_5$" Solid State Ionics 104 (1997), pp. 191-194.

(56) References Cited

OTHER PUBLICATIONS

Aono, et al., "DC Conductivity of $Li_{1.3}Al_{0.3}Ti_{1.7}(PO_4)_3$" Ceramic with Li Electrodes, Chemistry Letters, 1991, pp. 1567-1570.
Aono, et al., "Electrical Properties of Sintered Lithium Titanium Phosphate Ceramics $(Li_{1+X}M_XTi_{2-X}PO_4)_3, M^{3+}=Al^{3+}, Sc^{3+}, or Y^{3+})$", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Shuster, Nicholas, "LithiumWater Power Source for Low Power—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of The Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2(B)$ in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages).
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
EP patent application No. 03809186.4, Examination Report dated Mar. 21, 2006.
International patent application No. PCT/US2004/033371, International Search Report dated Mar. 6, 2006.
International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and Symp. Int. Veh. Electr., Rapp, $4^{th}$ vol. 1, paper 32.4, 23 pp., Publisher: Electr. Veh. Counc., New York, N.Y. Conden: 39UPAD, 1976.
International patent application No. PCT/US2004/033361, International Search Report and Written Opinion dated Jan. 16, 2006.
International patent application No. PCT/US2004/033424, International Search Report and Written Opinion dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
International patent application No. PCT/US2004/033424, Invitation to Pay Additional Fees dated Jan. 6, 2006.
EP patent application No. 04794699.1, Examination Report dated May 31, 2007.
CN patent application No. 200480037293.5, Office Action mailed Aug. 22, 2008.
EP patent application No. 04794699.1, Examination Report mailed Aug. 5, 2008.
AU patent application No. 2003301383, Examination Report mailed Sep. 29, 2008.
CN patent application No. 200480042697.3, Office Action mailed Feb. 15, 2008.
U.S. Appl. No. 11/245,472, Office Action mailed Jul. 24, 2008.
CN patent application No. 200480042697.3, Office Action mailed Dec. 19, 2008.
Thokchom, Joykumar S., et al., Water Durable Lithium Ion Conducting Composite Membranes from the $Li_2O—Al_2O_3—TiO_2—P_2O_5$ Glass-Ceramic, Journal of The Electrochemical Society, 154 (4), 2007, pp. A331-A336.
U.S. Appl. No. 11/245,472, Office Action mailed Jan. 8, 2009.
U.S. Appl. No. 11/824,579, Office Action mailed Jan. 29, 2009.
CN patent application No. 200480042697.3, Office Action mailed Jun. 5, 2009.
U.S. Appl. No. 11/245,472, Office Action mailed Jul. 8, 2009.
AU patent application No. 2004306866, Exam Report mailed Apr. 9, 2009.
AU patent application No. 2004316638, Office Action mailed Aug. 3, 2009.
International patent application No. PCT/US06/48755, International Search Report mailed Apr. 7, 2008.
International patent application No. PCT/US06/48755, Written Opinion mailed Apr. 7, 2008.
Ogasawara T. et al., "Rechargeable $Li_2O_2$ Electrode for Lithium Batteries", J. Am. Chem. Soc. 128(4), 2006, pp. 1390-1393.
Foster D.L. et al., "Ceramic Membranes for Lithium Batteries", Proceeding of the $42^{nd}$ Power Sources Conference, Jun. 2006, P2.14.
Read J., "Electrolyte Formulation and Temperature Performance of the $Li/O_2$ Battery", Proceeding of the $9^{th}$ Electrochemical Power Sources R&D Symposium, Jun. 2005, 15 pages.
EP patent application No. 04794699.1, Notice of Allowance mailed Jun. 10, 2009.
U.S. Appl. No. 12/334,116, Office Action mailed Oct. 27, 2009.
EP patent application No. 03809186.4, Examination Report mailed Nov. 11, 2009.
U.S. Appl. No. 11/245,472, Office Action mailed Feb. 4, 2010.
U.S. Appl. No. 12/475,403, Office Action mailed Feb. 8, 2010.
International patent application No. PCT/US2009/047278, International Search Report and Written Opinion dated Jan. 21, 2010.
AU patent application No. 2003301383, Notice of Acceptance mailed Nov. 26, 2009.
U.S. Appl. No. 12/484,063, "Catholytes for asqueous lithium / air battery cells", Visco et al., filed Jun. 12, 2009.
U.S. Appl. No. 12/484,079, "Cathodes and reservoirs for aqueous lithium / air battery cells", Visco et al., filed Jun. 12, 2009.
U.S. Appl. No. 12/484,081, "Hydrogels for aqueous lithium / air battery cells", Visco et al., filed Jun. 12, 2009.
KR patent application No. 9-5-2012-016417008, Office Action mailed Mar. 21, 2012.
CA patent application No. 2,542,304, Exam Report mailed Apr. 3, 2012.
U.S. Appl. No. 12/484,079, Office Action mailed Apr. 27, 2012.
U.S. Appl. No. 13/236,428, Notice of Allowance mailed Apr. 25, 2012.
U.S. Appl. No. 12/888,154, Office Action mailed May 3, 2012.
U.S. Appl. No. 12/484,081, Office Action mailed Jun. 21, 2012.
U.S. Appl. No. 12/484,063, Office Action mailed Aug. 1, 2012.

(56) References Cited

OTHER PUBLICATIONS

U.S. Appl. No. 13/453,964, Notice of Allowance mailed Aug. 14, 2012.
U.S. Appl. No. 12/888,154, Notice of Allowance mailed Aug. 20, 2012.
U.S. Appl. No. 12/484,063, Notice of Allowance mailed Sep. 14, 2012.
U.S. Appl. No. 12/484,079, Office Action mailed Nov. 29, 2012.
U.S. Appl. No. 13/663,224, "Catholytes for aqueous lithium/air battery cells," Visco et al., filed Oct. 29, 2012.
U.S. Appl. No. 13/464,835, "Protected lithium electrodes having tape cast ceramic and glass-ceramic membranes," Visco et al., filed May 4, 2012.
U.S. Appl. No. 13/464,835, Office Action mailed Sep. 25, 2012.
JP patent application No. 2006-552102, Office Action mailed Sep. 25, 2012.
KR patent application No. 9-5-2012-016417008, Notice of Allowance mailed Nov. 23, 2012.
U.S. Appl. No. 12/484,081, Notice of Allowance mailed Jan. 18, 2013.
JP Appl. No. 2006-535572, Decision to Grant a Patent mailed Sep. 4, 2012.
CA patent application No. 2,555,637, Notice of Allowance mailed Apr. 17, 2012.
CN patent application No. 200980131906.4, First Office Action mailed Dec. 4, 2012.
MX patent application No. 2010/013888, First Official Action mailed Jan. 25, 2013.
U.S. Appl. No. 13/615,351, Office Action mailed Mar. 25, 2013.
U.S. Appl. No. 12/484,079, Notice of Allowance mailed Apr. 17, 2013.
CA patent application No. 2,542,304, Office Action mailed Jan. 30, 2013.
U.S. Appl. No. 13/464,835, Office Action mailed May 2, 2013.
U.S. Appl. No. 13/615,351, Notice of Allowance mailed May 31, 2013.
U.S. Appl. No. 12/973,779, Office Action mailed May 31, 2013.
U.S. Appl. No. 13/929,653, "Protected active metal electrode and battery cell structures with non-aqueous interlayer architecture," Visco et al., filed Jun. 28, 2013.
U.S. Appl. No. 13/663,224, Office Action mailed Jun. 21, 2013.
EP patent application No. 09794889, Supplemental Search Report mailed May 21, 2013.
JP patent application No. 2011-513742, Office Action mailed Oct. 8, 2013.
JP patent application No. 2006-552102, Office Action mailed Nov. 26, 2013.

HIGH ENERGY DENSITY AQUEOUS LITHIUM/AIR-BATTERY CELLS

CROSS-REFERENCE TO RELATED APPLICATIONS

This application claims priority to U.S. Provisional Patent Application No. 61/159,786 filed Mar. 12, 2009, titled HIGH ENERGY DENSITY AQUEOUS LITHIUM/AIR CELLS; and U.S. Provisional Patent Application No. 61/078,294 filed Jul. 3, 2008, titled AQUEOUS LI/AIR CELLS; and U.S. Provisional Patent Application No. 61/061,972 filed Jun. 16, 2008, titled AQUEOUS LI/AIR CELLS. Each of these prior applications is incorporated herein by reference in its entirety and for all purposes.

BACKGROUND OF THE INVENTION

The present invention relates generally to active metal electrochemical devices. More particularly, this invention relates to Li/air battery cells capable of achieving high energy densities The large free energy for the reaction of lithium with oxygen has attracted the interest of battery researchers for decades. The theoretical specific energy for lithium/air chemistry far exceeds Li-ion battery chemistry. The high specific energy for metal/air chemistries has long been recognized, as evidenced by the development and commercial success of the Zn/Air battery. However, Li/air chemistry introduces some rather unique challenges.

Lithium is a reactive alkali metal and is incompatible with aqueous electrolytes. Corrosion of the negative electrode due to reaction of the metal anode with water and oxygen in aqueous electrolyte is clearly a much more serious issue for lithium than it is for zinc. The corrosion rate of lithium metal in aqueous electrolytes is on the order of several amps/cm$^2$ for neutral electrolytes and drops to tens of mA/cm$^2$ in highly basic media. Accordingly, with the exception of some early work by Littauer on lithium/water batteries, the historical development of lithium/air batteries has been dominated by the use of aprotic non-aqueous electrolytes.

Essential to the development of aqueous Li/air batteries is the ability to stabilize the lithium anode in the presence of water and oxygen. U.S. Pat. Nos. 7,282,296; 7,282,302; and 7,282,295; and U.S. Patent Application Pub. No.: US 2004/0197641 to Visco et al., disclose protected lithium anodes having protective membranes and protective membrane architectures that are stable in water environments and are capable of discharging into aqueous electrolytes.

The present invention is directed to the further development and enhancement of the overall performance of Li/air battery cells via the chemistry taking place at the cathode.

SUMMARY OF THE INVENTION

The present invention relates to Li/air battery cells. The cells include a protected lithium electrode and an aqueous catholyte in a cathode compartment. The cells are configurable to achieve high energy densities, in accordance with various aspects of the invention. In addition to the aqueous catholyte, which is defined as electrolyte in contact with the cathode, components of the cathode compartment include an air cathode (e.g., oxygen electrode) for the reduction of molecular oxygen In various aspects the invention relates to the chemistry of the subject lithium/air cells, and in particular to that chemistry which occurs in the cathode compartment when it (the compartment) is exposed to ambient air during cell operation.

In accordance with Li/air cells of the current invention and the above aspect, in various embodiments active species dissolved in the catholyte partake in the cell reaction, and discharge products form that render the cathode compartment hygroscopic. By this expedient, the cathode compartment scavenges water from the ambient air during cell operation, and this facilitates a number of advantages, including: preventing dry out of the catholyte, prolonging the discharge, and enhancing the cell energy density (Wh/kg and Wh/l).

In accordance with the instant invention, the aqueous catholyte is active in that species dissolved therein participate, as a reagent, in the cell discharge reaction.

In various embodiments, the active catholyte comprises water and an active substance material dissolved therein, and the dissolution generates active species that participate, as a reagent, in the cell discharge reaction. Typically, the active substance material is an active salt or a solid active compound. However, the invention is not limited as such, and in certain embodiments the active substance material is an active liquid, including inorganic liquids.

Appropriate concentrations of active and non-active salts may impart a number of benefits to the cell, including: i) rendering the cathode compartment hygroscopic during cell operation; ii) effectuating, prior to initial discharge, a very low vapor pressure of water above the catholyte; iii) enhancing or maintaining the conductivity of the catholyte at various stages of discharge, and iv) stabilizing the protective membrane/catholyte interface during storage under open circuit conditions.

In various embodiments, high concentrations of dissolved active salts are desirable, as this may render the compartment, prior to initial discharge, hygroscopic and, during discharge, may effect a lowering of the catholyte's equilibrium relative humidity (ERH) sufficient to provide a driving force for the ingress of water into the cathode compartment from the ambient air. In specific embodiments, active salt concentrations of at least 1M, or at least 2M, or at least 3M, or at least 4M; for example about 2M or about 3M or about 4M, are suitable. In certain embodiments, catholyte saturated or nearly saturated with dissolved active salts can be used, and is preferred.

In various embodiments, the cathode compartment, prior to initial discharge, contains a water soluble solid phase active salt that operably dissolves in contact with the catholyte, and thereby, in that process, generates dissolved active salt species that participate, as a reagent, in the cell reaction. Accordingly, solid phase active salts provide a source from which a relatively large amount of dissolved active salt species may form in the catholyte during cell operation. By use of the term "operably dissolves" or "operable dissolution" it is meant that the referenced material dissolves during cell operation.

In various embodiments the catholyte comprises at least two different dissolved salts. For instance: an active first salt and a different second salt. The salts (first or second) may be active or non-active. In various embodiments the first salt is active and the second salt, non-active, is a lithium salt, preferably a hygroscopic lithium salt such as, but not limited to, halides, including lithium bromide (e.g., LiBr), lithium iodide (e.g., LiI), and lithium chloride (e.g., LiCl) and nitrates (e.g., LiNO$_3$)).

In various embodiments the catholyte, prior to initial discharge, has a low equilibrium relative humidity (ERH). Preferably the ERH of the catholyte, prior to initial discharge or prior to cell activation, is less than 50%, less than 40%, less than 30%, less than 20% or less than 15%, at room temperature (about 20° C.). And preferably, it is low enough to render the cathode compartment hygroscopic. Low ERH values may be achieved through the use of high dissolved salt concentrations in the catholyte (including combinations of active and non-active salts) or saturating the catholyte with salt, particularly hygroscopic salts, and it may be achieved by introducing solid phase salts into the cathode compartment, including solid phase active salts and solid phase non-active salts, or combinations thereof. In specific embodiments catholyte ERH is lowered by a combination of dissolved active and non-active salts. For instance, a high concentration of a dissolved active salt (for example, at least 3M (e.g., about 4M) and a lower concentration of a dissolved lithium salt (for example, at least 2M; e.g., 2M)

In specific embodiments lithium salts are dissolved in the catholyte in a sufficient concentration to prevent resistance rise in the cell during storage under open circuit conditions prior to initial discharge. In this regard, initial (prior to initial discharge) Li salt (ion) concentrations of at least 2M, for example 2M, can be effectively used.

In various embodiments the Li/air cell of the instant invention is discharged over a first stage that corresponds to dissolved active salt species participating, as a reagent, in the discharge reaction, and a second stage of discharge in which dissolved active salt species do not participate. Typically, water molecules are generated during the first stage of discharge and consumed, as a reagent, during the second stage.

In various embodiments, the discharge product, hygroscopic, may be used to facilitate water management in the cathode compartment, including preventing catholyte dry out. Moreover, in various embodiments, the absorptive capacity of the cathode compartment enables the cells of the instant invention to be manufactured with less water than that which is necessary for the cell to deliver its rated capacity. In accordance with these embodiments, the cell, initially having an insufficient amount of water, absorbs the necessary amount of water from the ambient air during cell operation.

In another aspect, the invention provides a Li/air cell comprising a reservoir structure incorporated in the cathode compartment, and which may serve several functions, including: providing a porous physical structure for catholyte and, when present, solid phase active salts; retaining water operably absorbed from the ambient air; and accommodating both liquid and solid products of discharge. In various embodiments, the reservoir, in the form of a layer, may have a porous metal oxide structure, or a carbonaceous structure, or a polymeric structure that is sufficiently elastic to expand during discharge. In certain embodiments, in order to tailor the location of where solid discharge products form, the compartment may comprise more than one reservoir layer, e.g., a first reservoir layer adjacent the cathode and a second reservoir layer adjacent the protected anode.

In yet another aspect, the invention provides a Li/air cell comprising a hydrogel or a hydrogel layer which may be utilized to great advantage in the cell, including improving specific energy of the cell by allowing a high loading of active and supporting electrolyte salts, both of which may be dissolved in the catholyte or present in the form of un-dissolved solids (e.g., active solid phase salts and solid supporting salt (e.g., lithium salts including LiCl, LiBr and LiI). In various embodiments, the hydrogels are disposed in the cathode compartment between the anode and the cathode, and their swelling properties make them particularly suitable for retaining large amounts of water absorbed by the catholyte during discharge, and by this expedient preventing catholyte leakage.

In yet even another aspect, the invention provides a Li/air cell having an inventive air cathode capable of accommodating large amounts of discharge product. Another novel feature of the inventive air cathode is that the active carbon layer is disposed in the bulk of the cathode and the cathode expands upon discharge. By this expedient, the inventive air cathodes are particularly suitable for high capacity Li/Air cells because the cathode, expanding on discharge, will continue to accommodate large amounts of solid product as it forms.

The present invention provides a lithium/air cell comprising a protected lithium electrode (PLE) and a cathode compartment comprising a cathode (e.g., an air cathode) for the reduction of molecular oxygen and an aqueous catholyte, which is defined herein as an aqueous electrolyte solution in contact with the cathode. In accordance with the instant invention, the aqueous catholyte is active in that it or its constituents (e.g., dissolved active salts and/or water) partake in the cell reaction during discharge.

In various embodiments of the invention, the battery cells also comprise one or more of the following: prior to initial discharge, solid phase active salt in the cathode compartment; a catholyte saturated, or nearly saturated, with active salt or non-active salt or a lithium compound or some combination thereof; a catholyte comprising a combination of at least two different dissolved salts, including a high concentration of a first active salt and a lower concentration of a second hygroscopic lithium salt (e.g., LiCl); a catholyte comprising a metal halide active salt wherein said metal of the active salt is not lithium; a catholyte comprising a nitrate active salt (e.g., ammonium nitrate); a catholyte comprising a supporting lithium salt concentration of 2 molar Li or higher or otherwise sufficient to prevent resistance rise in the cell during storage under open circuit conditions prior to initial discharge; a combination of dissolved active and supporting salts in the catholyte; a porous inorganic solid reservoir structure; a solid reservoir structure comprising a carbonaceous porous structure; a solid reservoir structure configured to expand upon discharge; a hydrogel reservoir structure; a cathode pore structure configured to accommodate insoluble discharge products such that operation of the cell is not disrupted prior to substantially complete discharge; a cathode configured to expand upon accommodating discharge product.

The protected anode comprises a lithium ion conductive protective membrane having a first and second surface. The membrane is impermeable to liquids and air and is configured to prevent direct contact between active lithium and constituents of the cathode compartment; particularly it protects the lithium anode from contacting aqueous catholyte and exposure to ambient air. The first surface of the membrane faces the lithium anode and the second membrane surface faces the cathode compartment. In various embodiments, the catholyte, in contact with the cathode, also contacts and substantially covers at least a portion of the protective membrane second surface; and in contact, the protective membrane is chemically compatible with the aqueous catholyte.

The cathode compartment, prior to initial discharge, comprises an aqueous catholyte comprising water and a salt dissolved therein. The catholyte, in contact with the protective membrane and the cathode, provides an ionically conductive medium of sufficient ionic conductivity to support the electrical current that flows, during discharge, between anode and cathode. And when the cell is a secondary, the conductivity is sufficient to support the charging current.

In various embodiments the catholyte salt, active or non-active, comprises halogen (e.g., chlorine, bromine, or iodine) or nitrate or ammonium. In certain embodiments the active salt is a nitrate (e.g., $NH_4NO_3$) or a halide or an ammonium compound or it is a compound that dissolves, in the catholyte, hydrolytically (e.g., a compound comprising a metal (e.g., $AlCl_3$). In specific embodiments the halide salt is an ammonium halide salt ($NH_4Br$, $NH_4Cl$, $NH_4I$) or a metal halide salt (e.g., $MgCl_2$), wherein the metal of the halide is not lithium, for example the metal may be aluminum or titanium, or more generally an alkaline metal or a transition metal. Typically, when the active salt is a metal halide, it does not contain lithium.

In various embodiments, the catholyte, prior to initial discharge, comprises more than one dissolved salt. For instance, the catholyte may comprise more than one active salt, or a combination of active salts and non-active salts (e.g., lithium salts). Or the catholyte may comprise two or more active salts and, optionally, at least one supporting electrolyte salt dissolved therein. In a specific embodiment the catholyte comprises two different lithium salts: a first lithium salt (LiCl) which is very hygroscopic and soluble and a second lithium salt (LiBr) that while significantly heavier than the first salt is extremely hygroscopic and so its facility to drive water absorption into the compartment offsets the additional weight of its anion, and the combined salt system is an effective mechanism for balancing these effects.

In specific embodiments, the catholyte comprises an active salt and a non-active salt, the active salt having a higher concentration than that of the non-active salt; e.g., a high concentration of an active salt and a lower concentration of lithium salt. In certain embodiments, the catholyte comprises, dissolved therein, more than one type of active salt and more than one type of lithium salt.

In various embodiments the aqueous catholyte comprises at least one dissolved active salt (e.g., $NH_4Cl$) that participates in the cell or cathode reaction during discharge to form corresponding lithium salts (e.g., LiCl), and in some instances the cell reaction generates water.

In certain embodiments, the lithium salt that forms during discharge is highly soluble in the catholyte or is hygroscopic and absorbs moisture from the ambient air, or is both highly soluble and hygroscopic. The lithium salt formed as a result of the cell discharge reaction may be in solution (i.e., a dissolved salt) or it may precipitate out of solution as a solid. In various embodiments, the corresponding lithium salt formed as a result of the discharge reaction is highly soluble and has significantly higher solubility in water than the dissolved active salt.

In various embodiments the catholyte comprises a dissolved active salt. In certain embodiments the dissolved active salt is a weak acid. In certain embodiments the weak acid salt is dissolved in the catholyte in concentrations of about 2 molar or greater.

In certain embodiments the dissolved active salt is a halide salt, such as an ammonium halide salt (e.g., $NH_4Cl$, $NH_4Br$ and $NH_4I$) or a metal halide salt (e.g., $AlCl_3$). In certain embodiments the dissolved active salt is a nitrate salt, e.g., $NH_4NO_3$, or ammonium thiocynate (i.e., $NH_4CNS$).

In various embodiments, prior to initial discharge, an active solid phase salt is present in the cathode compartment, typically in the reservoir, which reacts (or otherwise interacts) in contact with water of the cathode compartment or reacts in contact with aqueous catholyte to form a dissolved active salt in the catholyte. In various embodiments the solid phase active salt is deliquescent. In various embodiments the active solid substance is microencapsulated. In various embodiments the solid phase active salt comprises one or more of halogen (e.g., chlorine, bromine, iodine) or nitrate, or ammonium. In certain embodiments the solid phase active salt is a halide salt. In certain embodiments thereof it is an ammonium halide salt (e.g., $NH_4Cl$, $NH_4Br$ or $NH_4I$). In specific embodiments the solid phase active salt is a nitrate (e.g., $NH_4NO_3$).

In other embodiments thereof it is a metal halide salt, where the metal is not lithium. In specific embodiments thereof the metal halide salt does not comprise lithium metal (e.g., $AlCl_3$). In specific embodiments the solid phase active salt is a metal compound that dissolves hydrolytically in the catholyte, and the metal of the compound is not lithium. In various embodiments, prior to initial discharge, the catholyte is a saturated salt solution in contact with solid phase active salt. The saturated salt solution may be saturated with at least one of the following: an active salt or a non-active salt, or a lithium salt, or a combination thereof.

During cell discharge species are formed in the catholyte or precipitate out of the catholyte as a solid, and these species are generally referred to herein as discharge products. In various embodiments, the discharge product is hygroscopic and sufficiently lowers the water vapor pressure above the catholyte to render or maintain the cathode compartment hygroscopic, or otherwise in equilibrium with the ambient relative humidity.

In various embodiments, at least one of the discharge products is a lithium compound, typically a lithium salt, composed of lithium cation(s) and an anion of the active salt. Accordingly, in some instances, the discharge product may be considered, and is sometimes referred to, herein, as a corresponding lithium salt, which is to mean that the discharge product is a species formed between lithium ions (e.g., those which pass into the catholyte from the anode during discharge) and an anion of the active salt. For instance, when the active salt is a halide (e.g., $NH_4Cl$ or $NH_4Br$), the discharge product may be a lithium halide salt, (e.g., LiCl or LiBr).

The invention also provides a variety of cell fabrication techniques and configurations.

These and other features of the invention are further described and exemplified in the detailed description below.

DETAILED DESCRIPTION OF SPECIFIC EMBODIMENTS

Figure 1A:
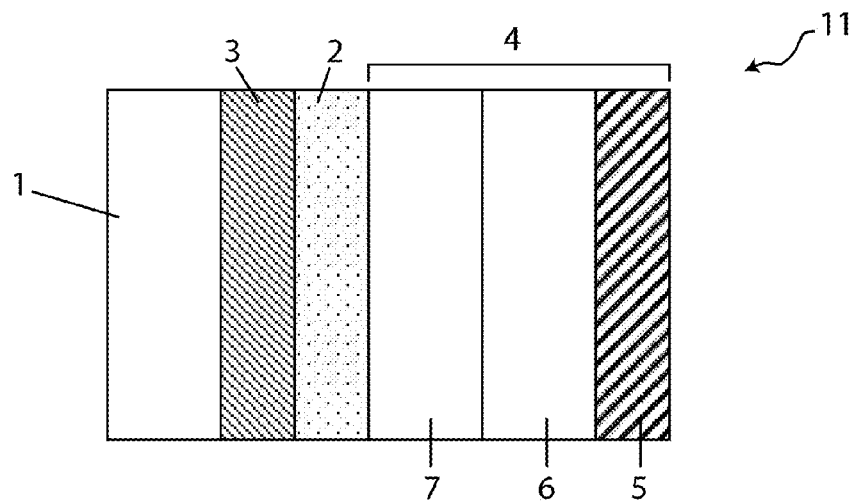
FIG. 1A is a schematic illustration of a Li/air battery cell in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known process operations have not been described in detail so as to not unnecessarily obscure the present invention.

Introduction

The present invention relates to Li/air battery cells. In various ways, cells in accordance with the present invention are configurable to achieve very high energy density, for example, higher than would be otherwise attainable without active salt in the catholyte. The cells include a protected lithium electrode (e.g., protected lithium metal or alloy or intercalation anode) and an aqueous catholyte in a cathode compartment. In addition to the aqueous catholyte, which is defined as electrolyte in contact with the cathode, components of the cathode compartment include an air cathode (e.g., oxygen electrode) for the reduction of molecular oxygen.

In various embodiments of the invention, the battery cells also comprise one or more of the following: prior to initial discharge or prior to initial activation of the cell or subsequent to initial discharge, a solid phase active salt in the cathode compartment; a catholyte comprising a saturated salt solution, or a nearly saturated salt solution; a catholyte comprising a combination of at least two different dissolved salts, including a high concentration of an active salt and a lower concentration of a second hygroscopic supporting salt (e.g., a lithium salt); a catholyte comprising a metal halide or ammonium halide active salt or salts wherein said metal of the active salt is not lithium; a catholyte comprising a nitrate active salt (e.g., ammonium nitrate); a catholyte comprising a supporting lithium salt concentration of 2 molar Li or higher or otherwise sufficient to prevent resistance rise in the cell during storage under open circuit conditions prior to initial discharge; a combination of dissolved active and supporting salts in the catholyte; a porous inorganic solid reservoir structure; a reservoir comprising a carbonaceous porous structure; a solid reservoir structure configured to expand upon discharge; a hydrogel reservoir structure; a cathode pore structure configured to accommodate insoluble discharge products such that operation of the cell is not disrupted prior to substantially complete discharge.

DEFINITIONS

To facilitate a better understanding of the present invention, rather than to limit its scope, the following definitions are provided:

As used herein the term "active substance material" refers to a material such as a salt that upon dissolving in a solvent of the catholyte, typically water, generates dissolved active species that participate in the cell discharge reaction. Furthermore, the dissolved active species generated by the dissolution of the active substance material may be derived from the dissolution of the salt or the salt may dissolve hydrolytically or dissolve and react to form the active catholyte species.

As used herein the term "solid phase active substance material" refers to a solid material that upon dissolving in a solvent of the catholyte generates or forms active species, dissolved in the catholyte, that participate, as a reagent, in the cell discharge reaction. And by the use of the term "solid phase" it is meant to emphasize that the state of matter of the solid phase active salt is solid. Typically the solid phase active substance material is a solid phase active salt, or more generally a solid phase active compound.

As used herein and in the claims, the term "dissolution" or "dissolves" or "dissolving" is intended to encompass, without limitation, the process whereby a solid substance (e.g., a salt) dissolves, with or without complete dissociation, or dissolves hydrolytically or upon dissolving further reacts, for instance, to form dissolved active species in the catholyte.

The use of the term "cell activation" refers to the initial exposure of the cathode compartment to the ambient air with the distinct intent of either absorbing water moisture from the ambient air and/or molecular oxygen.

When referring to solid phase active salts, the term "operably dissolves" means that the solid phase active salt dissolves into a solvent of the catholyte during cell operation, which includes that operational period corresponding to active discharge, when electrical current flows between anode and cathode, and/or that operational period corresponding to the cell resting under open circuit conditions, subsequent to cell activation.

Cell Structure

A battery cell in accordance with the current invention is schematically shown in FIG. 1A. The cell comprises a Li anode 1. The anode may be Li metal or a Li metal alloy or Li intercalation material (e.g., lithiated carbon). In one example, a Li metal foil may be used. Lithium anodes, including intercalation anodes and lithium alloys and lithium metal anodes are well known in the lithium battery art. In preferred embodiments the anode is lithium metal (e.g., in foil or sintered form) and of sufficient thickness (i.e., capacity) to enable the cell to achieve the rated discharge capacity of the cell. The anode may take on any suitable form or construct including a green or sintered compact (such as a wafer or pellet), a sheet, film, or foil, and the anode may be porous or dense. Without limitation, the lithium anode may have a current collector (e.g., copper foil, or suitable expandable metal) pressed or otherwise attached to it in order to enhance the passage of electrons between it and the leads of the cell. Without limitation the cell may be anode or cathode limited. When anode limited, the complete discharge (corresponding to rated capacity) will substantially exhaust all the lithium in the anode. When cathode limited, some active lithium will remain subsequent to the cell delivering its rated capacity.

The anode is protected with a protective membrane architecture chemically stable to both the anode and the environment of an adjacent cathode compartment (4). The protective membrane architecture typically comprises a solid electrolyte protective membrane 2 and an interlayer 3. The protective membrane architecture is in ionic continuity with the Li anode 1 and is configured to selectively transport Li ions into and out of the cathode compartment 4 while providing an impervious barrier to the environment external to the anode.

Protective membrane architectures suitable for use in the present invention are described in applicants' co-pending published US Applications US 2004/0197641 and US 2005/0175894 and their corresponding International Patent Applications WO 2005/038953 and WO 2005/083829, respectively, incorporated by reference herein.

Figure 1B:
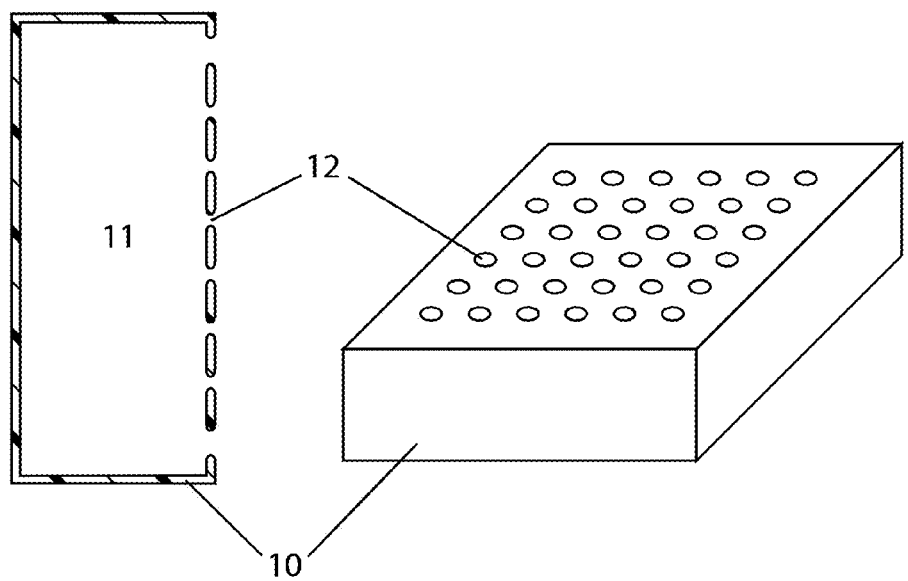
FIG. 1B shows a Li/air battery cell in accordance with the present invention enclosed in a cell case in cross sectional and perspective depictions.

With reference to FIG. 1B, there is illustrated (in cross-section (left) and perspective (right)) an embodiment of a lithium air battery cell 10 in accordance with the instant invention. The cell is disposed in a case 11 (e.g., a metal or polymeric case, including but limited to a heat sealable multilayer laminate used for that purpose). The case comprises one or more ports 12 for the passage of oxygen and moisture from the ambient air. To effectively reach the cathode and the cathode compartment, as illustrated in FIG. 1B, the case side wall of which contains the ports is adjacent to the cathode.

In many, but not necessarily all embodiments, the cell is activated by removing a barrier material (not shown) which covers the ports to prevent, prior to cell activation, premature or excessive exposure of the cathode compartment to ambient air. The cell activated by removing the barrier material (e.g., by the act of peeling off a tab (barrier material layer).

The case may further comprise an additional port (not shown) for introducing, water or catholyte into the cathode compartment after the cell has been manufactured. Without limitation, the catholyte (or water) may be introduced, prior or subsequent to one or more of the following: cell activation or initial discharge.

FIGS. 2A-D illustrate representative protective membrane architectures from these disclosures suitable for use in the present invention. The protective membrane architectures provide a barrier to isolate a Li anode from ambient and/or the cathode side of the cell while allowing for efficient ion Li metal ion transport into and out of the anode. The architecture may take on several forms. Generally it comprises a solid electrolyte layer that is substantially impervious, ionically conductive and chemically compatible with the external ambient (e.g., air or water) or the cathode environment.

Figure 2A:
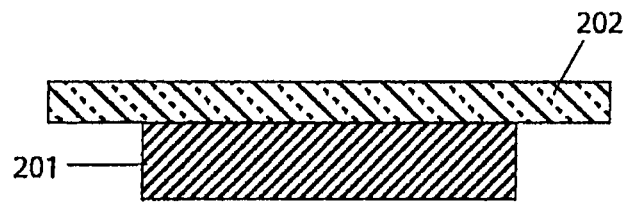
FIGS. 2A-D illustrate various alternative configurations of a protective membrane architecture in accordance with the present invention.

Referring to FIG. 2A, the protective membrane architecture can be a monolithic solid electrolyte 202 that provides ionic transport and is chemically stable to both the active metal anode 201 and the external environment. Examples of such materials are Na-β" alumina, $LiHfPO_4$ and NASICON, Nasiglass, $Li_5La_3Ta_2O_{12}$ and $Li_5La_3Nb_2O_{12}$. $Na_5MSi_4O_{12}$ (M: rare earth such as Nd, Dy, Gd).

More commonly, the ion membrane architecture is a composite composed of at least two components of different materials having different chemical compatibility requirements, one chemically compatible with the anode, the other chemically compatible with the exterior; generally ambient air or water, and/or battery electrolytes/catholytes. By "chemical compatibility" (or "chemically compatible") it is meant that the referenced material does not react to form a product that is deleterious to battery cell operation when contacted with one or more other referenced battery cell components or manufacturing, handling, storage or external environmental conditions. The properties of different ionic conductors are combined in a composite material that has the desired properties of high overall ionic conductivity and chemical stability towards the anode, the cathode and ambient conditions encountered in battery manufacturing. The composite is capable of protecting an active metal anode from deleterious reaction with other battery components or ambient conditions while providing a high level of ionic conductivity to facilitate manufacture and/or enhance performance of a battery cell in which the composite is incorporated.

Figure 2B:
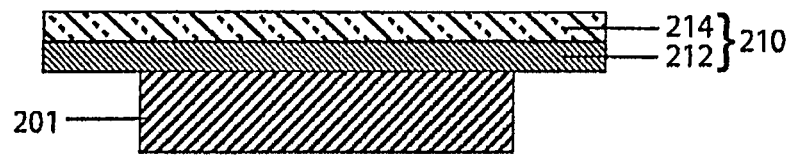
Figure 2C:
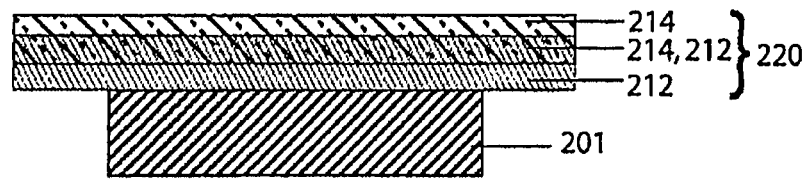

Referring to FIG. 2B, the protective membrane architecture can be a composite solid electrolyte 210 composed of discrete layers, whereby the first material layer 212 (also sometimes referred to herein as "interlayer") is stable to the active metal anode 201 and the second material layer 214 is stable to the external environment. Alternatively, referring to FIG. 2C, the protective membrane architecture can be a composite solid electrolyte 220 composed of the same materials, but with a graded transition between the materials rather than discrete layers.

Generally, the solid state composite protective membrane architectures (described with reference to FIGS. 2B and C) have a first and second material layer. The first material layer (or first layer material) of the composite is ionically conductive, and chemically compatible with an active metal electrode material. Chemical compatibility in this aspect of the invention refers both to a material that is chemically stable and therefore substantially unreactive when contacted with an active metal electrode material. It may also refer to a material that is chemically stable with air, to facilitate storage and handling, and reactive when contacted with an active metal electrode material to produce a product that is chemically stable against the active metal electrode material and has the desirable ionic conductivity (i.e., a first layer material). Such a reactive material is sometimes referred to as a "precursor" material. The second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Figure 2D:
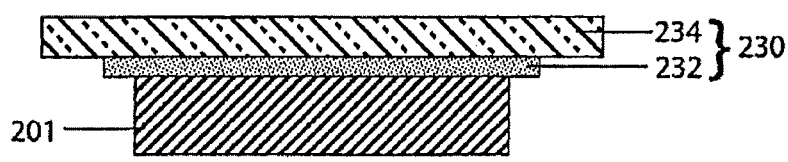

A fourth suitable protective membrane architecture is illustrated in FIG. 2D. This architecture is a composite 230 composed of an interlayer 232 between the solid electrolyte 234 and the active metal anode 201 whereby the interlayer is impregnated with anolyte. Thus, the architecture includes an active metal ion conducting separator layer with a non-aqueous anolyte (i.e., electrolyte about the anode), the separator layer being chemically compatible with the active metal and in contact with the anode; and a solid electrolyte layer that is substantially impervious (pinhole- and crack-free) ionically conductive layer chemically compatible with the separator layer and aqueous environments and in contact with the separator layer. The solid electrolyte layer of this architecture (FIG. 2D) generally shares the properties of the second material layer for the composite solid state architectures (FIGS. 2B and C). Accordingly, the solid electrolyte layer of all three of these architectures will be referred to below as a second material layer or second layer.

A wide variety of materials may be used in fabricating protective composites in accordance with the present invention, consistent with the principles described above. For example, in the solid state embodiments of Figs. B and C, the first layer (material component), in contact with the active metal, may be composed, in whole or in part, of active metal nitrides, active metal phosphides, active metal halides active metal sulfides, active metal phosphorous sulfides, or active metal phosphorus oxynitride-based glass. Specific examples include $Li_3N$, $Li_3P$, LiI, LiBr, LiCl, LiF, $Li_2S$—$P_2S_5$, $Li_2S$—$P_2S_5$—LiI and LiPON. Active metal electrode materials (e.g., lithium) may be applied to these materials, or they may be formed in situ by contacting precursors such as metal nitrides, metal phosphides, metal halides, red phosphorus, iodine, nitrogen or phosphorus containing organics and polymers, and the like with lithium. A particularly suitable precursor material is copper nitride (e.g., $Cu_3N$). The in situ formation of the first layer may result from an incomplete conversion of the precursors to their lithiated analog. Nevertheless, such incomplete conversions meet the requirements of a first layer material for a protective composite in accordance with the present invention and are therefore within the scope of the invention.

For the anolyte interlayer composite protective architecture embodiment (FIG. 2D), the protective membrane architecture has an active metal ion conducting separator layer chemically compatible with the active metal of the anode and in contact with the anode, the separator layer comprising a non-aqueous anolyte, and a substantially impervious, ionically conductive layer ("second" layer) in contact with the separator layer, and chemically compatible with the separator layer and with the exterior of the anode. The separator layer can be composed of a semi-permeable membrane impregnated with an organic anolyte. For example, the semi-permeable membrane may be a microporous polymer, such as are available from Celgard, Inc. The organic anolyte may be in the liquid or gel phase. For example, the anolyte may include a solvent selected from the group consisting of organic carbonates, ethers, lactones, sulfones, etc, and combinations thereof, such as EC, PC, DEC, DMC, EMC, 1,2-DME or higher glymes, THF, 2MeTHF, sulfolane, and combinations thereof. 1,3-dioxolane may also be used as an anolyte solvent, particularly but not necessarily when used to enhance the safety of a cell incorporating the structure. When the anolyte is in the gel phase, gelling agents such as polyvinylidine fluoride (PVdF) compounds, hexafluoropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will, of course, also include active metal salts, such as, in the case of lithium, for example, $LiPF_6$, $LiBF_4$, $LiAsF_6$, $LiSO_3CF_3$ or $LiN(SO_2C_2F_5)_2$. In the case of sodium, suitable anolytes will include active metal salts such as $NaClO_4$, $NaPF_6$, $NaAsF_6$ $NaBF_4$, $NaSO_3CF_3$, $NaN(CF_3SO_2)_2$ or $NaN(SO_2C_2F_5)_2$, One example of a suitable separator layer is 1 M $LiPF_6$ dissolved in propylene carbonate and impregnated in a Celgard microporous polymer membrane.

The second layer (material component) of the protective composite may be composed of a material that is substantially impervious, ionically conductive and chemically compatible with the first material or precursor, including glassy or amorphous metal ion conductors, such as a phosphorus-based glass, oxide-based glass, phosphorus-oxynitride-based glass, sulphur-based glass, oxide/sulfide based glass, selenide based glass, gallium based glass, germanium-based glass, Nasi-glass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x}Ti_{2-x}Al_x(PO_4)_3$ $(0.1 \leq x \leq 0.9)$ and crystallographically related structures, $Li_{1+x}Hf_{2-x}Al_x(PO_4)_3$ $(0.1 \leq x \leq 0.9)$, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ (M: rare earth such as Nd, Gd, Dy) $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
|---|---|
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0 < 10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or and $Li_{1+x+y}Q_xTi_{2-x}Si_yP_{3-y}O_{12}$ where $0 < X \leq 0.4$ and $0 < Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

Another particularly suitable material for the second layer of the protective composite are lithium ion conducting oxides having a garnet like structures. These include $Li_6BaLa_2Ta_2O_{12}$; $Li_7La_3Zr_2O_{12}$, $Li_5La_3Nb_2O_{12}$, $Li_5La_3M_2O_{12}$ (M=Nb,Ta)$Li_{7+x}A_xLa_{3-x}Zr_2O_{12}$ where A may be Zn. These materials and methods for making them are described in U.S. Patent Application Pub. No.: 2007/0148533 (application Ser. No. 10/591,714) and is hereby incorporated by reference in its entirety and suitable garnet like structures, are described in International Patent Application Pub. No.: WO/2009/003695 which is hereby incorporated by reference for all that it contains.

The composite should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the anode. For example, the first material layer for the solid state membranes can have a thickness of about 0.1 to 5 microns; 0.2 to 1 micron; or about 0.25 micron. Suitable thickness for the anolyte interlayer of the fourth embodiment range from 5 microns to 50 microns, for example a typical thickness of Celgard is 25 microns.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example about 20 microns.

Seals and methods of making seals which are particularly suitable for sealing protected anodes described hereinabove and elsewhere, including compliant and rigid seals, are fully described in US Patent Application No.: 2007/0037058 and US Patent Application No.: US 2007/0051620 to Visco et al., and are hereby incorporated by reference in their entirety.

Cathode Compartment

Referring again to FIG. 1, the cathode compartment 4 comprises an air cathode 5 (also sometimes referred to herein as "oxygen electrode") and an aqueous catholyte 6, which is disposed between the cathode 5 and the solid electrolyte protective membrane 2 and is in direct contact with the cathode 5 for reducing molecular oxygen. The cathode compartment 4 can further comprise one or more porous solid reservoir structures 7 disposed between the solid electrolyte protective membrane 2 and the air cathode 5. The aqueous catholyte 6 and porous solid reservoir 7 are represented as separate layers in FIG. 1 for ease of illustration, however they may be and often are co-extensive in many embodiments of the invention.

As described further below, in various embodiments, the aqueous catholyte (which is defined as electrolyte in contact with the cathode (e.g., oxygen electrode)) contains dissolved and, in at least some cases, active catholyte salts.

Aqueous Catholytes

In various embodiments, aqueous catholytes of the present invention comprise the following components:
1) a dissolved active catholyte salt, which participates in the cathode discharge;
2) a dissolved supporting Li salt, which does not directly participate in the cathode discharge;
3) optionally, undissolved catholyte salt(s);
4) optionally, an additional hygroscopic agent;
5) optionally, additives enhancing cell performance.

One class of active catholyte salts of the current invention has a formula $MHal_n$, where M is $NH_4$, Al, Ti or Mg; Hal is Cl, Br or I; and n has the appropriate stoichiometric value based on the valence of M. The preferred salts are $NH_4Cl$ and $AlCl_3$. The term "salt" as used in this context is intended to encompass compounds that react (e.g., dissolve or hydrolyze) to form dissolved active salts. Other active catholyte salts that can be effectively used in Li air cells are $NH_4NO_3$ and $NH_4Br$ $NH_4CNS$. All of these salts participate in the cathode process forming their corresponding Li salts. During cathode discharge, their corresponding hygroscopic Li salts form and prevent the drying out of the cell by absorbing moisture from air.

An exemplary active salt of the instant invention is $NH_4Cl$. Dissolved in the catholyte, the active salt participates in the cell reaction. The discharge reaction with ammonium chloride, in dilute conditions, may appropriately be described as follows:

$$2Li + 2NH_4Cl + \tfrac{1}{2}O_2 = H_2O + 2NH_3 + 2LiCl$$

In accordance with the above reaction, water and ammonia (and/or ammonium hydroxide) is generated as the active salt, partaking in the discharge reaction, is converted to a corresponding lithium salt discharge product (LiCl). Preferably, the corresponding lithium salt is highly soluble in the catholyte, and preferably more soluble than that of the active salt. One metric for gauging the solubility of the active salt or that of its corresponding lithium salt is based on water solubility. Accordingly, in various embodiments, the solubility in water of the corresponding lithium salt is greater than the water solubility of the active salt from which it was converted. In various embodiments it is preferable to use an active salt that converts, during discharge, to a corresponding hygroscopic lithium salt that imparts to the catholyte a low equilibrium relative humidity. For instance the equilibrium relative humidity of a saturated water solution of LiCl is about 11% and LiBr is about 6% at room temperature (20° C.).

High concentrations of active catholyte salts, much higher than are typically used in conventional metal/air (e.g., Zn/air) cells are desirable in order to increase the amount of water collected by the hygroscopic solid phase discharge products. Concentrations of at least 1M, or at least 2M, for example 4M, are suitable. In specific embodiments, a saturated or near saturated solution of the active salt in the catholyte can be used.

Particular Salts

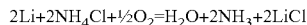
$NH_4Cl$, $NH_4Br$ and $NH_4I$

Solubility of $NH_4Cl$ in water at room temperature (RT) is approximately 28 wt % and increases with temperature, which is significantly larger than solubility of LiOH (approx. 11 wt % at RT). At the same time, both discharge products, LiCl and $NH_3$, have very high solubilities. LiCl is hygroscopic and absorbs moisture from atmosphere during cell storage and discharge. Importantly, during cell discharge each mole of $NH_4Cl$ also generates half a mole of $H_2O$, which can be used during further discharge involving formation of LiOH. $NH_3$ can evaporate, thereby decreasing the weight of the cathode compartment. Use of $NH_4Br$ or $NH_4I$ leads to formation of LiBr and LiI, which are much more hygroscopic than LiCl, therefore these salts can be used and may be particularly useful when a cell has to operate at low humidity.

An additional benefit of the $NH_4Cl$ salt is associated with buffering the catholyte during cell storage and initial discharge. Since solid electrolyte protective membranes are chemically stable in $NH_4Cl$-based electrolytes, the use of $NH_4Cl$ as the active salt results in improved storage performance of the battery cell.

$NH_4NO_3$ $NH_4NO_3$ has a very high solubility of 68 wt % at RT and the discharge product, $LiNO_3$, is very hygroscopic and even more soluble than LiCl. Additionally, air cathodes in cells with $NH_4NO_3$ active salt can have traditional inexpensive Ni current collectors, since Ni is stable in $LiNO_3$-containing solutions.

$AlCl_3$ $AlCl_3$ has a high solubility of 31 wt %; the discharge products are hygroscopic and prevent the drying out of the cell. It has been found that cells with this salt have an increased depth of discharge.

Supporting Li Salts

Supporting Li salts of this invention maintain conductivity of catholyte at different stages of discharge. It has also been found that introduction of certain concentrations of Li salts, substantially higher than conventional Li salt concentrations, into the catholyte prior to initial discharge prevents a rise in the cell's resistance during storage under open circuit conditions. In this regard, initial (prior to initial discharge) Li salt (ion) concentrations of at least 2M, for example 2M, can be effectively used. While the invention is not limited by any particular theory of operation, this effect is attributed to the suppression of ion exchange at the interface between protective membrane and liquid catholyte. Hygroscopic supporting Li salts can be used in order to maintain moisture balance in the cell before the start of discharge. This is one more function of supporting Li salts.

In a specific case, the catholyte of the current invention comprises the active salt and the supporting salt with the same anion (common anion), i.e. $NH_4Cl$ or/and $AlCl_3$ are used in combination with LiCl or in combination with LiBr (e.g., $NH_4Cl$ with LiBr), $NH_4NO_3$ with $LiNO_3$, and $NH_4CNS$ with LiCNS. Depending on the particular application and the conditions under which the battery will operate, the catholyte of the current invention may comprise the active salt only and not comprise any concentrations of the supporting salt or may comprise the supporting salt only and not comprise any concentrations of the active salt. For instance, in applications where the evolution of gaseous $NH_3$ during cell discharge is not desirable, the catholyte can contain LiCl or/and $LiNO_3$, but not $NH_4C_1$ or $NH_4NO_3$. Some specific compositions of the catholytes of the current invention are: 4M $NH_4Cl$+2M LiCl in water, 4M $NH_4NO_3$+2M $LiNO_3$ in water, 4M $NH_4CNS$+2M LiCNS in water, 2M $AlCl_3$+2M LiCl in water, 2.7M $AlCl_3$+1M LiCl in water.

In some embodiments, active salts and supporting Li salts with different anions are used. In one embodiment, hygroscopic LiBr or LiI are used as Li supporting salts in combination with $NH_4C_1$ and $NH_4NO_3$ active salts in order to prevent the drying out of the cell when discharging at low humidities. In some embodiments, the catholyte contains additional hygroscopic agents or co-solvents other than the Li salts. One particular example of such co-solvent is ethylene glycol, which can absorb as much water as 200% of its weight at 100% relative humidity.

In some cases, fine particles of inert solid compounds, such as silica or alumina, are added to the catholyte or to the cathode compartment in different locations: near the cathode surface, in the bulk of the catholyte reservoir, near the protective membrane surface. These particles create crystallization centers and control the precipitation of the discharge product.

In other embodiments the catholyte further comprises an inorganic liquid (other than water), including aprotic and protic organic and inorganic liquids ($TiCl_4$) that reacting with water of the catholyte form dissolved active species that participate, as a reagent, in the cell reaction.

In various embodiments the catholyte has a low equilibrium relative humidity (ERH) prior to initial discharge. Preferably the ERH of the catholyte, prior to initial discharge, is less than 50%, less than 40%, less than 30%, less than 20% or less than 15%, at room temperature (20 C). And preferably, it is low enough to render the cathode compartment hygroscopic upon cell activation.

Low ERH values may be imparted to the catholyte using high concentrations of active salts or saturating the catholyte with active salts, or using a combination of dissolved active salts and non-active salts, particularly non-active lithium salts, and especially lithium halides, which are extremely hygroscopic. In various embodiments, the catholyte comprises a combination of a highly concentrated active salt (e.g., $NH_4Cl$) and a lower concentration of a lithium halide salt (e.g., LiCl, LiBr or LiI). Salt combinations can be used to effectively lower the solubility limit of one or both salts. For instance, a high concentration of an active first salt can be used to lower the solubility of a second salt (e.g., lithium salt), and by this expedient the lithium salt may reach its solubility limit in the catholyte at a concentration below its solubility limit in pure water. In effective concentrations, the combination of a first and second salt, or more salts, interacting in their dissolved form can lead to early saturation at concentrations lower than that which would be expected based solely on their solubility limits in water.

In various embodiments, aqueous catholyte, including that which comprises an active salt dissolved therein, is incorporated in the cathode compartment during battery cell manufacture and in a sufficient amount to fill the pores of the reservoir layer, wet the cathode active layer, wet the surface of the protective membrane and imbibe a hydrogel, when present.

In certain embodiments, catholyte may be introduced into the compartment after cell manufacture but prior to initial cell discharge. By this expedient, the battery cell may be assembled, stored and transported in a "dry state" (i.e., substantially without, or free of, or in the absence of, catholyte and water) or in a semi-dry state with less, or substantially less, catholyte (or water) than that which is optimal for pore filling, wetting and the like. The advantages of assembling, storing and transporting a dry state cell include exceptionally light transport, optimal transport safety, and enhanced shelf life. In certain embodiments, it is contemplated that an operator (typically a person whom is using the battery to power a system or device, but not limited as such, and mechanical apparatus' are contemplated herein for that same purpose) introduces catholyte or water via an entry port in the battery cell case. The port provides external access to the cathode compartment for various intended uses, including the introduction of water, or active catholyte, or salts. For instance, in certain embodiments, the cathode compartment contains at least one of an active solid phase salt or a solid lithium salt, or both, and a battery operator introduces water and/or catholyte into the cathode compartment via the entry port.

In certain embodiments, the catholyte is wholly formed, or partly formed, in situ upon exposure of the cathode compartment to ambient air. For instance, the cathode compartment comprising at least one solid phase salt, for instance an active solid phase salt and/or a solid phase supporting electrolyte salt (e.g., LiCl) that, subsequent to cell activation, dissolves in contact with water absorbed from the ambient air. In certain embodiments thereof, the cathode compartment is substantially devoid of water prior to cell activation. In specific embodiments all the water necessary for cell discharge is obtained through absorption from the ambient air.

Advantages of Catholytes of the Current Invention

The Li/air cells of the present invention are in some ways analogous to the classic Zn/air cell with the alkaline KOH aqueous electrolyte. By analogy, the most natural choice of a catholyte for the Li/air cell would be aqueous LiOH. The neutral or slightly acidic catholyte of the current invention has several advantages over LiOH-based electrolytes.

First, solubility of LiOH in water at RT is only 11 wt %, far less than for aqueous KOH or active catholyte salts of the current invention. The air cell with such catholyte would deliver an insignificant capacity before LiOH starts to precipitate out. The use of a catholyte in accordance with the current invention allows for an increase in the capacity delivered prior to formation of solid discharge product.

Second, the discharge products of a cell with the catholytes of the current invention, such as LiCl, $LiNO_3$ and LiCNS, are much more hygroscopic than LiOH and therefore prevent cell drying much better. Importantly, solid electrolyte protective membranes are much more stable in contact with catholytes of current invention than in contact with LiOH, resulting in increased storage stability of the cell.

Also, it has been found that when a cell with the catholyte described herein is deeply discharged and precipitation of LiOH takes place, the total delivered capacity is significantly larger than could be expected from adding the capacity of active salt discharge (i.e., when $NH_4Cl$ transforms into LiCl) to the capacity of LiOH discharge. While the invention is not limited by any particular theory, this synergistic effect can be explained by an increase in conductivity and an improvement of morphology of the solid discharge product formed when LiOH and LiCl co-precipitate. Another explanation of this effect involves the high hygroscopicity of the discharge products, which absorb water and dilute LiOH as well as $Li_2CO_3$ formed when LiOH reacts with atmospheric $CO_2$.

Introduction of Solid Active Catholyte Salts into the Cathode Compartment

In another specific embodiment of the current invention active salts are introduced into the cathode compartment as solid phase active salt. When present, at least a portion of the solid phase active salt contacts the catholyte, and operably dissolves therein. In certain embodiments, the active solid phase salt is introduced into the cathode compartment in concentrations larger than its solubility limit in the catholyte And by this expedient, water necessary for the cell discharge need not be initially loaded into the cell, but may rather be absorbed into the cathode compartment from the atmosphere by the hygroscopic products formed during discharge. An important advantage of certain active solid phase salts is a decrease in battery cell weight. The active solid phase salts also serve to keep the active salt concentration in the catholyte high during cell operation In various embodiments some amount (at least a portion) of the solid phase active salt remains solid and in contact with the catholyte subsequent to initial discharge, and typically a portion remains solid and un-dissolved for a significant fraction of the discharge thereafter. In certain embodiments, subsequent to the cell delivering at least 10%, or at least 30%, or at least 50%, or at least 75%, of its rated capacity, or substantially 100% of its rated capacity, there exists in the cathode compartment a portion, or at least some amount, of active solid phase salt, still un-dissolved and in contact with catholyte.

During cell operation, when active solid phase salt is present in the cathode compartment, the catholyte may reach a very low equilibrium relative humidity, and, driven by the continual formation of hygroscopic solid discharge products, the catholyte may maintain those low values for a significant fraction of the total discharge.

In various embodiments, the catholyte reaches a low equilibrium relative humidity of less than 50%, or less 40%, or less than 30% or less than 20% or less than 15%, and in certain embodiments the catholyte maintains that ERH value over a significant fraction of the discharge, including that period which corresponds to the cell delivering over 50% of its rated cell capacity, or over 60%, or over 70%, or over 80%, or over 90%, or over the entire discharge.

In various embodiments, the equilibrium relative humidity of the catholyte remains less than or substantially equal to the ambient relative humidity (RH) for a significant fraction of the total time period (TTP) in which the cell operates. The total time period refers to the sum total of time between the start of initial discharge until the discharge is substantially complete, and includes periods of rest when the cell is under open circuit conditions. Preferably, the ERH of the catholyte is below or the same as the RH of the ambient air for more than 50% of the TTP, more preferably 75% and even more preferably 90%. In certain embodiments the ERH remains below the RH for the entire time period of cell operation (100% TTP).

Typically, the active solid phase substance (active solid phase salt) is incorporated in the cathode compartment during cell manufacture, although the invention is not limited as such and it is contemplated herein that the active solid phase salt may be loaded at a time subsequent manufacture, including: subsequent to manufacture and prior to cell activation; or subsequent to cell activation and prior to initial discharge; and it is also contemplated that active solid phase salt is loaded into the cathode compartment after initial discharge. Notably, in accordance with the instant invention, the active solid phase substance (active solid phase salt) is intentionally incorporated in the cathode compartment as a solid (i.e., solid sate of matter), and as such it is not formed solely as the result of unintentional, or even undesirable, phenomena, such as low temperature precipitation reaction, which is a reaction in which solid salts precipitate when the solution in which they are dissolved is lowered, usually to a temperature below room temperature, or other unintentional causes. And while low temperature precipitation may, in fact, take place in the cells of the instant invention when operated or stored below room temperature, the majority of the active solid phase salt present in the cathode compartment is not formed by an unintentional mechanism, and more typically 90% or more of the solid phase active salt is incorporated in the cathode compartment, with the distinct intent of doing so, and usually during cell manufacture or prior to initial cell activation.

In various embodiments the active solid phase substance (typically an active solid phase salt) is present in the cathode compartment in relatively large amount prior to initial discharge, or, in some cases, prior to cell activation. In various embodiments prior to cell activation or initial discharge the solid phase active salt is present in the cathode compartment in a larger amount than active salt dissolved in the catholyte.

In various embodiments, the mole ratio of the solid phase active salt to the active salt dissolved in the catholyte is greater than 1, or greater than 2, or even greater than 10.

In specific embodiments, the mole ratio has a value in the range of: from 2 to 3; from 3 to 4; from 4 to 5; from 5 to 6; from 6 to 7; from 7 to 8; from 8 to 9; or from 9 to 10.

Methods of Loading the Cathode Compartment with $NH_4Cl$ and Other Solid Active Salts of the Current Invention 1) Filling the pores of the reservoir layer by air spraying a slurry or solution of $NH_4Cl$ or another active salt. In current invention, the solution or slurry are based on water or its mixture with one or more co-solvents. Such co-solvents, both protic and aprotic, can be used to enhance the solubility of the active salt, improve the wettability of the reservoir layer, or disperse the solid salt particles. In one practically significant embodiment, methanol is added to the slurry to wet the porous reservoir layer during impregnation. One or more impregnation/drying cycles are used to fill the pores of the reservoir layer. In one particular embodiment, the reservoir layer is heated during impregnation.

2) Vacuum impregnation of the reservoir layer with $NH_4Cl$ or another active salt using its solutions or slurries in aqueous and non-aqueous solvents and their mixtures.

3) Impregnation of the reservoir layer with $NH_4Cl$ or another active salt by placing the reservoir layer in a bath with hot slurry or solution, followed by cooling and crystallization. In one embodiment, the reservoir filled with slurry or solution is cooled down to the cryohydrate point. As a result, the solution separates into two solid phases: $NH_4Cl$ and ice. Then, water is extracted with a solvent having negligible solubility of $NH_4Cl$ (acetone).

4) Coating the air cathode surface with slurry of $NH_4Cl$ or another active salt.

5) Pressing $NH_4Cl$ or another active salt into pellets or thin layers and placing them into the cathode compartment in contact with the air cathode. In one embodiment, the active salt is mixed with binders prior to the pressing operation. In another practically important embodiment, the active salt is mixed with inert inorganic powders, such as silica, alumina, etc. prior to the pressing operation in order to increase the area of grain boundaries of the polycrystalline active salt and to enhance its ionic conductivity. Other types of fillers, such as short carbon fibers, also can be used. In another embodiment, the active salt is mixed with powders of pore-forming agents prior to the pressing operation. After pressing, the pore-forming agents are removed via thermal decomposition or selective solubilization with non-aqueous solvents. As a result, porous active salt pellets or layers are formed. In one particular embodiment, ammonium bicarbonate with a low decomposition temperature of about 60° C. is used as a pore-forming agent.

In various embodiments, when the solid active salt is introduced into the cathode compartment, aqueous solution of the Li supporting salt or both Li supporting salt and active salt is also loaded into the cathode compartment. It can be achieved by filling the pellets of the solid active salt or the first reservoir layer (already impregnated with solid active salt) with the aqueous solution of the Li supporting salt or both Li supporting salt and active salt. Alternatively or additionally, it can be achieved by filling the second reservoir layer located between the protective membrane and the first reservoir layer with the same aqueous solution. As a result, the components of the cathode compartment and the protective membrane are in contact via liquid phase.

In an important embodiment, the amount of active salt introduced into the cathode compartment as a solid is significantly larger than the amount of active salt in the dissolved form, prior to initial discharge.

Discharge Stages

In various embodiments the discharge may be described as taking place in different stages, based on whether or not dissolved active salt species participate, as a reagent, in the discharge reaction: a first stage corresponding to that portion of the discharge when it does and the second stage to that portion when it does not; for instance, the second stage is reached once substantially all of the dissolved active salt species have been utilized, or those species may not be present in the catholyte. Although not limited as such, typically water is generated by the cell reaction during the first stage of discharge and water is consumed by the reaction during the second stage.

In various embodiments lithium/air cells of the instant invention encompass both first and second stages of discharge. Accordingly, in various embodiments, the rated capacity of the battery cell comprises the capacity delivered over the first and second stages of discharge. And in certain embodiments the rated capacity of the cell is equivalent to the sum total of the capacity delivered over the first and second stages. The invention, however, is not intended to be limited as such, and in some embodiments the cell may be exclusively discharged in one or the other of the first or second stages. Moreover, it is to be understood that the use of the term first and second is not intended to imply that the second stage necessarily follows the first stage, albeit this is usually the case, or that the first stage of discharge is necessary for second stage discharge.

Water molecules generated during the first stage of discharge may, without limitation, coalesce with the existing water in the catholyte or they may compound with constituents of the catholyte to form a structural hydrate (e.g., a hydrated solid salt, the water therein structural). The total amount of water reactively generated during first stage discharge is proportional to the sum total of active catholyte species that participate, as a reactant, in the discharge.

In accordance with embodiments of the instant invention the cathode compartment comprising solid phase active salts and/or dissolved active salts may be formulated with the objective of preventing catholyte dry out and improving cell performance, including enhancing specific energy and energy density. As described above, by making use of highly concentrated or saturated catholyte salt solutions, or certain salt combinations in the catholyte, or solid phase active salts, or some combination thereof, the cathode compartment may be rendered hygroscopic and sufficient amounts, and even large amounts, of water moisture, from the ambient air, absorbed over various periods of discharge. By this expedient, the energy density (Wh/kg and Wh/l) of the cell may be enhanced, in part, because less than the requisite amount of water necessary for the cell to achieve its rated discharge capacity is needed in the cathode compartment prior to initial discharge; or in certain embodiments prior to cell activation.

In accordance with various embodiments of the instant invention at least three different amounts of water molecules can be distinguished based on how or when that amount of water materializes in the cathode compartment: a first amount of water corresponding to that which is present in the catholyte prior to initial discharge; a second amount of water corresponding to that which is generated by the discharge reaction; and a third amount of water corresponding to that which, subsequent to the start of initial discharge, is absorbed by the catholyte from the ambient air. The total amount of water consumed by the discharge reaction is considered herein as corresponding to a fourth amount. And a fifth amount of water corresponds to that amount of water which is absorbed from the ambient subsequent to cell activation and prior to initial discharge.

In various embodiments, the first amount of water, or the sum of the first and second amount of water, is insufficient for the cell to achieve its rated discharge capacity. And for those embodiments, it is only through the absorption of a sufficient amount of water moisture, i.e., the third amount of water, that the cell is able to deliver its rated capacity on discharge. By manufacturing a cell with less water than that which is needed for full (complete) discharge, the cells of the instant invention are made lighter and more volumetrically efficient than would otherwise be possible. In various embodiments, the third amount of water is greater than the first amount of water, or greater than the sum of the first and second amount of water. In certain embodiments, the third amount of water is at least twice that of the first amount of water, or at least twice that of the sum of the first and second amount of water. In certain embodiments the cell is devoid of water prior to cell activation, and a sufficient amount of water is absorbed from the ambient prior to initial discharge to enable the cell to begin operation, (i.e., the fifth amount of water therein sufficient).

Solid Porous Structures as Reservoir Layers

It has been found that several types of porous structures can be effectively used as reservoir layers in Li/air aqueous cells in accordance with the present invention. These porous layers are chemically inert and compatible with the cathode and with the aqueous catholyte. In particular, they do not react with the catholyte components, cannot be oxidized by the cathode, and do not participate in the cell discharge as reagents. The first function of a porous reservoir disposed between the cathode and the protective membrane is to be loaded with liquid catholytes and/or solid phase salts. Solid structure(s) used as reservoir layer(s) have high porosity. It has also been found that reservoir layers can have a second function of accommodating both liquid and solid cell discharge products, thereby increasing the depth of discharge and improving cell characteristics. Additionally, the porous space of the reservoir layer retains water that is absorbed by the hygroscopic components of the catholyte during cell discharge and storage thereby making it available for discharge reactions.

Metal Oxide Porous Reservoirs

A species of metal oxide porous reservoir structure has previously been disclosed in applicants' prior published US Application US 2004/0197641. In this application, porous $ZrO_2$ (in particular, Zirconia cloth from Zircar Products, Inc.)

was noted in this context. It has now been determined that several specific $ZrO_2$ porous reservoir structures are suitable in accordance with the present invention, including a high porosity (>95%) zirconia felts ZYF-150, ZYF-100 and ZYF-50 from Zircar Zirconia Corp. In addition, metal oxides including $Al_2O_3$, $Y_2O_3$, MgO, etc. as felts, cloths and other porous structures are suitable. In particular, high porosity (>95%) alumina felts ALF-100 and ALF-50 from Fuel Cells Materials Corp. can be used.

A feature of porous reservoirs in accordance with the present invention is their ability to accommodate solid phase discharge product precipitation without adverse impact on cell function, or at least so that cell function is retained at an acceptable level despite solid phase discharge product precipitation. In order to accomplish this, the thickness of porous reservoir structures is much greater than that typically used in the context of Zn/air batteries, the closest commercially available corollary and typical starting point for other metal/air battery designs.

Carbonaceous Porous Reservoirs

Carbon and graphite cloths and felts, carbon papers and other porous structures are suitable as solid porous reservoir structures in accordance with the present invention. WDF graphite felt and VDG carbon felt from National Electric Carbon Products, Inc. and carbon felt from Fiber Materials, Inc. can be used. Carbonaceous materials can be fabricated to have a narrow tailored porosity or a graded porosity to optimize catholyte penetration and/or accommodation of solid phase discharge product precipitation without adverse impact on cell function, or at least so that cell function is retained at an acceptable level despite solid phase discharge product precipitation.

Not previously used in this context, carbonaceous reservoir structures have characteristics that confer additional benefits in Li/air cell implementations. Carbonaceous structures are lightweight, thereby improving cell energy density. They are also electronically conductive. The electronic conductivity of these reservoir structures can be used to help control the amount and location of solid phase cell discharge product precipitation.

Several methods can be used to enhance wettability of carbonaceous porous reservoirs, especially when they are used in combination with neutral or basic catholytes: treatment with hot acid (HCl or $H_2SO_4$), electrochemical pre-cycling of the carbonacious reservoirs or heat treatment in an oxygen-containing atmosphere. A specific method of treatment of carbon felts is heat treatment at 525-565° C. in air for 2-2.5 hrs.

Polymeric Porous Reservoirs

Polymeric layers with high porosity (e.g., at least 50%, for example 90%) can be used as reservoir structures. An example of such a reservoir is polypropylene fiber materials. Another important example is polyurethane foam, particularly reticulated foam. In a preferred embodiment, these materials are elastic and can expand during discharge with minimal damage to their porous structure and can retain liquid and solid discharge products, as well as water absorbed from air during cell discharge while cell function is retained at an acceptable level. In another preferred case, the polymeric reservoir structures are elastic enough to expand during discharge and keep all the cell components in contact with each other, obviating the need for separate mechanisms (such as springs) for accomplishing this in the assembled battery cell. These elastic polymeric porous reservoir structures can be particularly suitably combined with a compliant seal cell structure such as disclosed in applicants' copending published Application No. US 2007/0037058, incorporated by reference herein for this purpose.

Optionally, a second porous reservoir layer can be used in the cathode compartment in order to improve the contact between the solid electrolyte protective membrane and the first reservoir layer in the case when it is impregnated with solids. In this case, the second porous layer is also filled with liquid catholyte. Another function of the second reservoir layer can be to prevent or minimize the precipitation of the solid discharge products at the protective membrane. In this case, the porous structures of the first and second reservoir layers are configured such that solid phase discharge products will preferentially precipitate in the second reservoir layer (i.e., away from the reservoir/cathode interface). In another embodiment, the second porous reservoir layer optimizes the structure and conductivity of the precipitate near the surface of the protective layer. Accordingly, the first porous reservoir layer is made from a first component material and has a first pore structure, and the second porous reservoir layer is made from a second component material and has a second pore structure. In various embodiments, to establish preferential precipitation in one or the other of the first or second reservoir, the first pore structure is different from that of the second pore structure, and the first component material may also be different than the second component material. The pore structure may have uniform or varying pore size and pore shape. The porous solid components of the cathode compartment generally have an open porosity of at least 30%, more preferably at least 50%, even more preferably at least 70% and yet even more preferably at least 90%.

Hydrogels as Reservoir Layers

It has been found that hydrogels, hydrophilic polymer networks that can absorb water, can be effectively used in Li/air aqueous cells as reservoir layers in accordance with the present invention. Hydrogel layers of the current invention are compatible with the cathode and with the aqueous catholyte. In particular, they do not react with the catholyte components, cannot be oxidized by the cathode, and do not participate in the cell discharge as reagents. The hydrogel reservoir layer disposed between the cathode and the solid electrolyte protective membrane can be loaded with active and supporting catholyte salts in the dissolved form and possibly supplemented by and catholyte salts in the form of undissolved solids. The hydrogel reservoir layers of the current invention serve several other purposes. In particular, they can accommodate both liquid and solid products of cell discharge, thereby increasing the depth of discharge. Additionally, the hydrogel reservoir layers can retain the water that is absorbed by the hygroscopic components of the catholyte or hygroscopic products of the cell discharge. This is particularly beneficial when the hydrogel reservoir layers are loaded with solid active catholyte salts and the discharge products are highly hygroscopic. In this case, the hydrogel reservoir layers absorb water and swell, thereby preventing leakage from the cathode compartment.

The composition and synthesis of hydrogels are described in many publications. An extensive list of materials suitable for use in this invention can be found in I. R. Scott and W. J. Roff, Handbook of Common Polymers, CRC Press, 1971, incorporated by reference herein for this purpose. The hydrogels of the current invention can be based on both natural and synthetic polymers. They can be physical gels or chemical gels. The hydrophilic polymers used to synthesize hydrogel matrix and the methods for synthesizing physical and chemical hydrogels are listed in the following publications: B. D. Ratner and A. S. Hoffman, In: Hydrogels for Medical and Related Applications, American Chemical Society, Washington, D.C., 1976, pp. 1-36; A. S. Hoffman, Advanced Drug Delivery Reviews Vol. 43, pp. 3-12 (2002), which are incorporated herein by reference for this teaching. Suitable hydrophilic polymers include, but are not limited to polyesters, poly(vinyl alcohol) and polyacrylamide. In one particular embodiment the hydrogel reservoir layer based on crosslinked polyacrylamide is fabricated by casting the gel electrolyte prepared by adding ammonium persulfate (as a polymerization initiator) and N,N,N',N'_Tetrmethylenediamine (as an accelerator) to the mixture of acrylamide monomer and bis-acrylamide crosslinker dissolved in water. In one case, an active salt and a supporting Li salt are also added to that solution in such concentrations that the formed hydrogel electrolyte layer contains completely dissolved active and supporting salts. In another case, prior to crosslinking the solution is loaded with solid active salt in a concentration greater than the salt's solubility limit, so that the resulting hydrogel layer contains undissolved solid active salt and dissolved supporting salt. In one embodiment, the concentration of the solid active salt is not constant, but rather is changing across the reservoir hydrogel layer. In another embodiment the salt concentration is higher near the cathode and lower near the protective membrane.

In the current invention, multi-layer hydrogels can be used to improve the battery cell's characteristics. In this case, the reservoir layers comprise two or more hydrogels based on different or identical polymers and containing different or identical active and supporting catholyte salts. In one embodiment, in order to improve the contact between the cathode and the hydrogel layer loaded with solid active salt particles, this layer is coated with another thin hydrogel layer containing no solid active salt, which is in direct contact with the cathode. In another embodiment, the thin hydrogel layers containing no solid active salt are disposed not only between the hydrogel layer loaded with the solid active salt and the cathode surface, but between the hydrogel layer loaded with the solid active salt and the solid electrolyte protective membrane as well.

Air Cathodes

In embodiments of the invention, an air cathode analogous to that used in Zn/Air batteries or low temperature fuel cells (e.g., PEM), and which are well known to those of skill in that art, may be used as the air cathode in the inventive Li/air battery cells described herein.

In various embodiments, the instant Li/air cell comprises an inventive air cathode comprising, at least, a first sectional layer comprising a first gas diffusion (e.g., Teflon) backing layer (which is positioned adjacent to the air side in the cell), a wet-proof gas-supply layer, for example made of Teflon and acetylene black, a metal screen current collector and an active carbon layer.

The type of metal used for the current collector may be chosen based on its chemical stability in the cell, specifically its stability in contact with the aqueous catholyte. In specific embodiments the metal screen current collector is titanium.

The active carbon layer may contain an electrocatalyst or may be uncatalyzed. The following catalysts can be used in the air cathodes of the current invention: oxides of Mn, Co and Ru and other metal oxides; cobalt phthalocyanines, iron phthalocyanines and manganese phthalocyanines.

In certain embodiments the inventive air cathode comprises the first sectional layer and a second sectional layer, typically a porous carbonaceous structure, adjacent to it. In specific embodiments the active layer provides the first section surface forming the interface with the second section. By this expedient the active layer is disposed in the bulk of the air cathode.

Porous carbon structures particularly suitable for use as a second sectional layer include graphite cloths and felts and carbon papers, and the like.

In various embodiments the first and second sectional layers are adhered or bonded at the interface, thereby forming what is termed herein as a unitary cathode structure. Alternatively, the two sections may be placed side by side in the cell, whereupon they adhered to each other during discharge, and by this expedient form, in-situ, the unitary structure. As described hereinabove, the first and second sectional layers may form a unitary cathode structure in contact, however the invention is not limited as such, and additional material layers may be disposed as a component material layer in the unitary structure, between the first and second layers.

The inventive cathode serves to accommodate solid products that form in the cell during discharge. Another interesting feature of the inventive air cathode is that the active carbon layer, where the cathode electroreduction takes place, is disposed in the bulk of the cathode and the cathode expands upon discharge. By this expedient, the inventive cathodes of the instant invention are particularly suitable for high capacity Li/Air cells because the cathode, expanding on discharge, for example a 2-fold increase in thickness, or as much as a 10 fold increase in thickness or more, will continue to accommodate solid product as it forms.

In one embodiment, when the active catholyte salt is of the type $MHal_n$ (in particular, $NH_4Cl$ and $AlCl_3$), the Ti current collector is used instead of the traditional Ni current collector in order to avoid corrosion.

In Li/air batteries, the discharge products have to be accommodated within the cathode compartment. Air cathodes of the same structure as the air cathodes of the Zn/air batteries are unable to accommodate large amounts of the discharge products. Cathodes with traditional structure can be used in combination with porous reservoirs described in the current invention. Alternatively, the oxygen electrode has a pore structure configured to accommodate insoluble discharge products such that operation of the cell is not disrupted prior to substantially complete discharge.

In the case when the reservoir layer is a carbonaceous porous structure placed in direct contact with the active layer, we effectively form a new carbon-based air cathode. The resulting air cathode has a unique structure. It employs an active layer in the depth of the electrode rather than on the surface as in traditional air cathodes. Carbonaceous porous reservoir is uncatalyzed and has a relatively large resistance, so the electroreduction mostly occurs at the surface of the active layer in the depth of the electrode, keeping the discharge products away from the protective solid electrolyte membrane. The resulting air cathode functions as a gas diffusion electrode and a carbonaceous porous reservoir at the same time. The proposed new cathode is one of the subjects of the current invention.

In one embodiment, the cathode is fabricated outside of the cell prior to its assembly. In another important embodiment, the cathode is fabricated by bringing the gas diffusion electrode and the carbonaceous porous reservoir in intimate contact during cell assembly.

EXAMPLES

The following examples provide details illustrating advantageous properties of cells in accordance with the present invention. These examples are provided to exemplify and more clearly illustrate aspects of the present invention and in no way intended to be limiting.

Discharge tests were performed in the Li/Air cells employing double-sided solid electrolyte-protected Li anode with flexible seal and the cathode compartment components of the current invention. The cells were placed in the Environmental Chamber at 25° C. and relative humidity of 50%. Each cell had one double-sided anode located between two cathode compartments having identical components. The solid electrolyte membranes had the size of 25.4 mm×25.4 mm. The cathode compartment components had the following sizes: air cathode: 26 mm×26 mm; porous catholyte reservoir layers or hydrogel reservoir layers: 25.4 mm×25.4 mm. The air cathodes employed the gas-diffusion Teflon backing layers having a Gurley number of 2000.

Example 1

Figure 3:
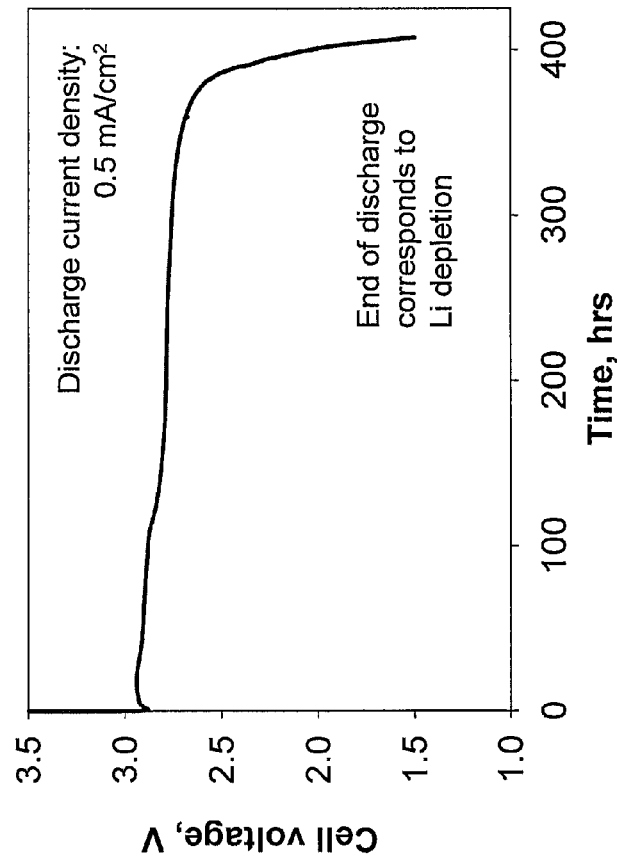
FIG. 3 illustrates performance of a Li/air cell having 4M $NH_4Cl$, 2M LiCl catholyte and zirconia felt reservoir layers.

FIG. 3 illustrates performance of a Li/Air cell having 4M $NH_4Cl$, 2M LiCl catholyte and zirconia felt reservoir layers.

Example 2

Figure 4:
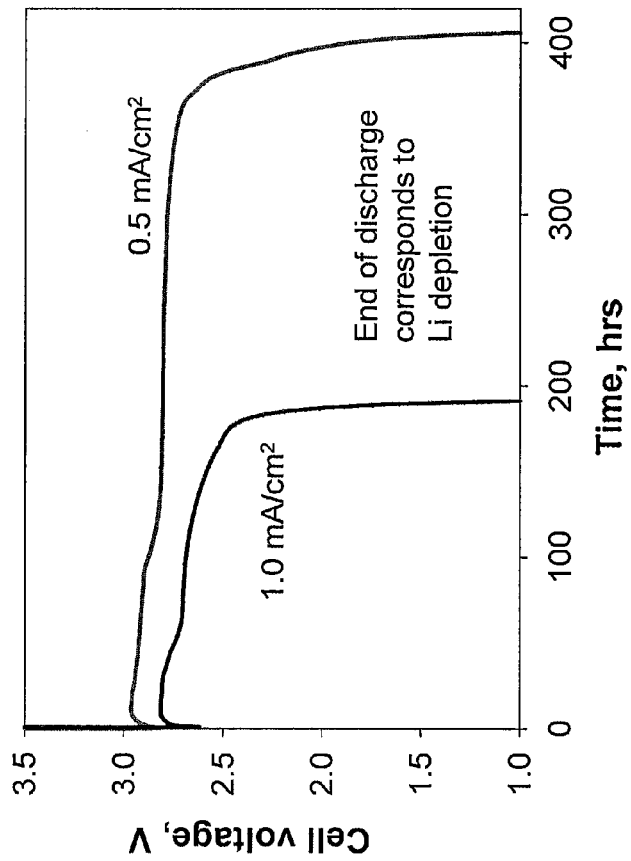
FIG. 4 illustrates performance of a Li/Air cell having 4M $NH_4Cl$, 2M LiCl catholyte and graphite felt reservoir layers.

FIG. 4 illustrates performance of a Li/Air cell having 4M $NH_4Cl$, 2M LiCl catholyte and graphite felt reservoir layers.

Example 3

Figure 5:
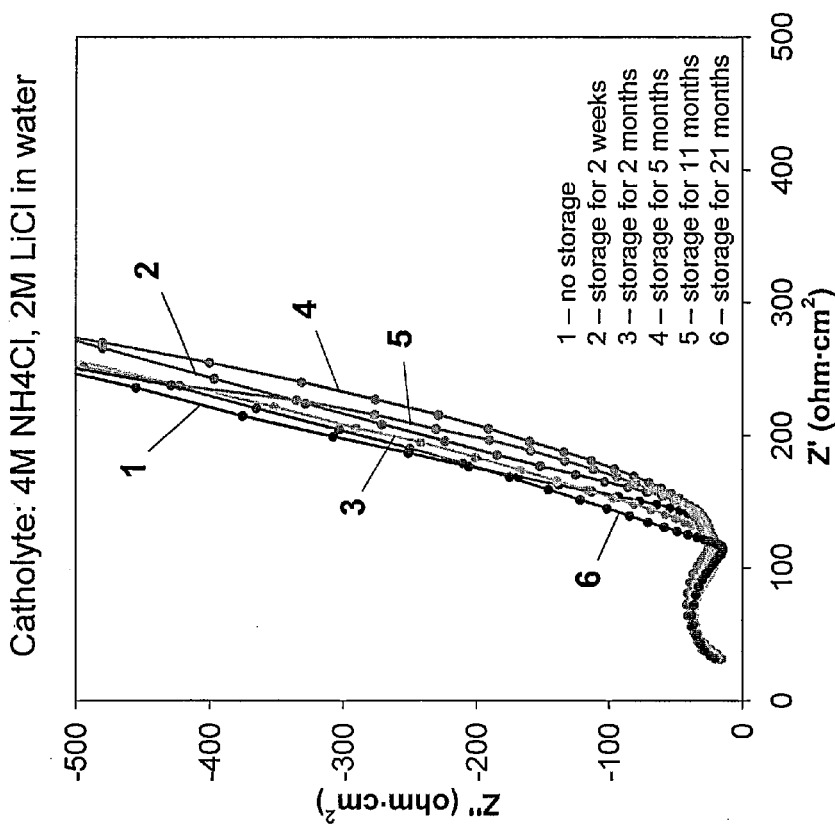
FIG. 5 illustrates stability of a solid electrolyte protective membrane in contact with 4M $NH_4Cl$, 2M LiCl catholyte during long-term storage.

FIG. 5 illustrates stability of a solid electrolyte protective membrane in contact with 4M $NH_4Cl$, 2M LiCl catholyte during long-term storage.

Example 4

Figure 6:
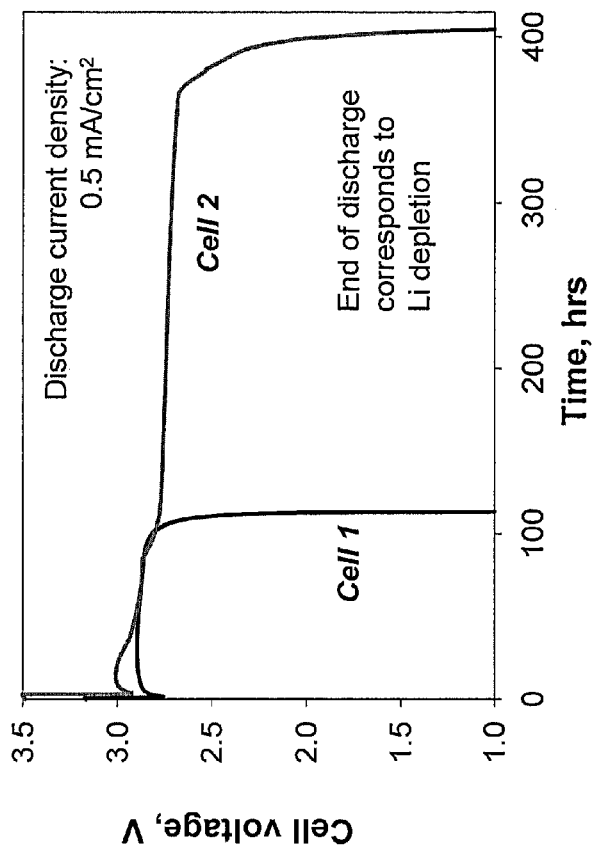
FIG. 6 illustrates comparative performances of Li/Air cells having 4M $NH_4NO_3$, 2M $LiNO_3$ and 1M LiOH catholytes.

FIG. 6 illustrates comparative performances of Li/Air cells having 4M $NH_4NO_3$, 2M $LiNO_3$ and 1M LiOH catholytes.

Example 5

Figure 7:
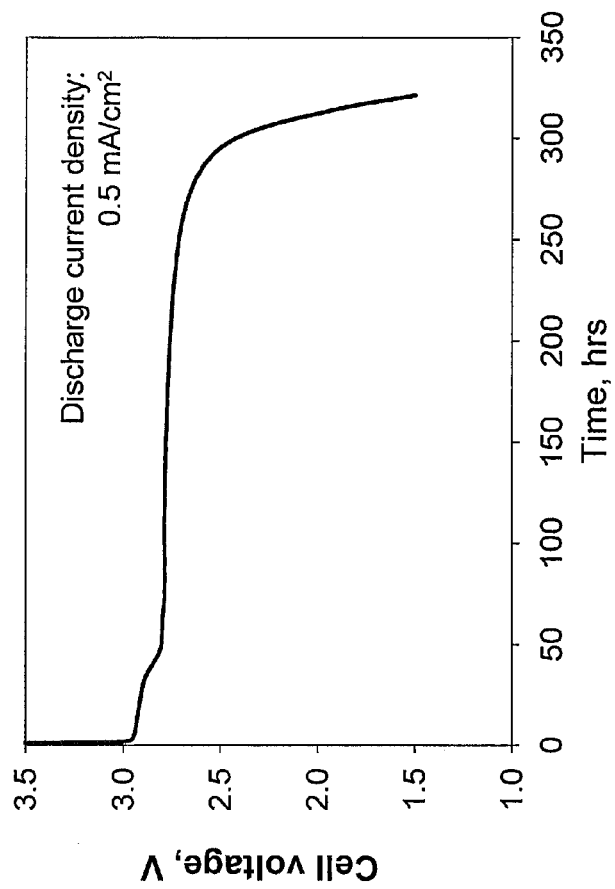
FIG. 7 illustrates performance of a Li/Air cell with 2.7M $AlCl_3$, 1M LiCl catholyte and alumina felt reservoir layers.

FIG. 7 illustrates performance of a Li/Air cell with 2.7M $AlCl_3$, 1M LiCl catholyte and alumina felt reservoir layers.

Example 6

Figure 8:
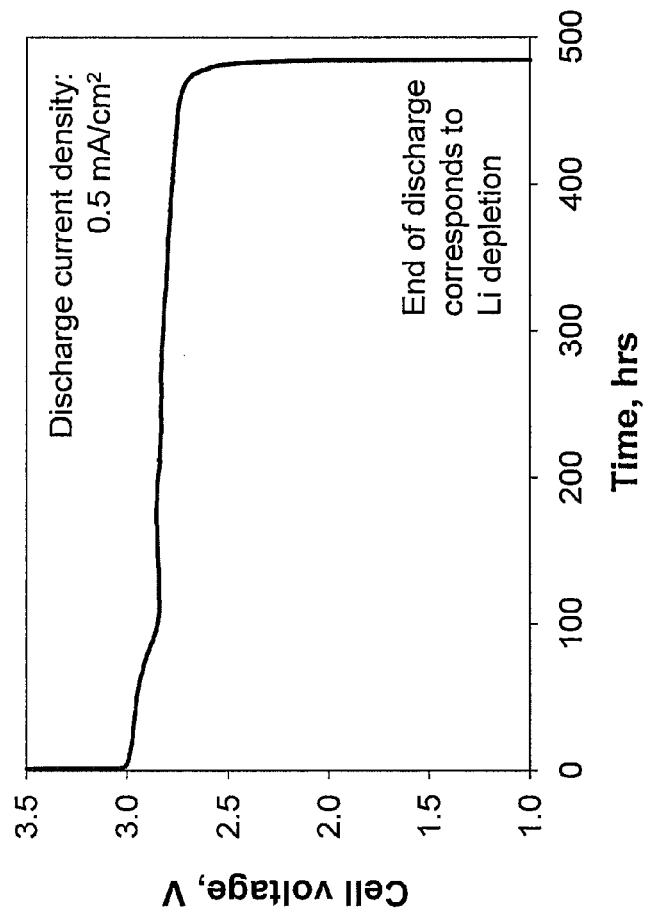
FIG. 8 illustrates performance of a Li/Air cell with 2.7M $AlCl_3$, 1M LiCl catholyte and graphite felt reservoir layers.

FIG. 8 illustrates performance of a Li/Air cell with 2.7M $AlCl_3$, 1M LiCl catholyte and graphite felt reservoir layers.

Example 7

Figure 9:
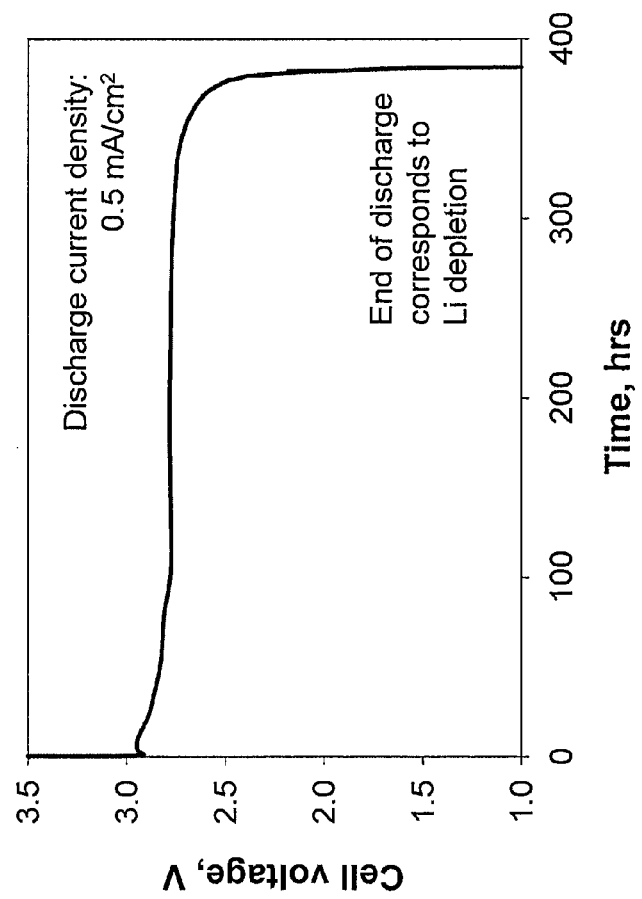
FIG. 9 illustrates performance of a Li/Air cell having alumina felt reservoir layers impregnated with solid $NH_4Cl$ salt and additionally filled with 4M $NH_4Cl$, 2M LiCl catholyte.

FIG. 9 illustrates performance of a Li/Air cell having alumina felt reservoir layers impregnated with solid $NH_4Cl$ salt and additionally filled with 4M $NH_4Cl$, 2M LiCl catholyte.

Example 8

Figure 10:
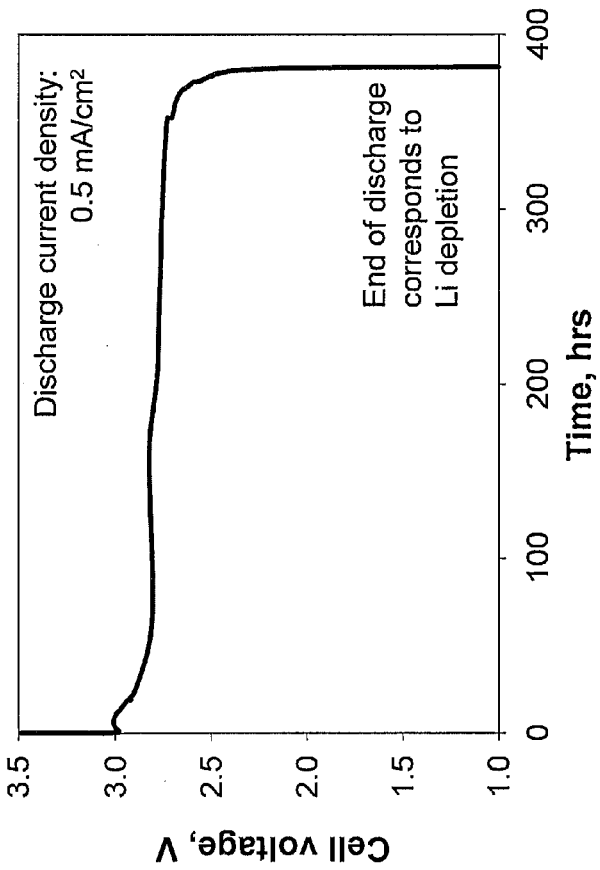
FIG. 10 illustrates performance of a Li/Air cell having pressed pellets of $NH_4Cl$ salt mixed with alumina powder and Whatman micro fiber filters GF/A as second reservoir layers filled with 4M $NH_4Cl$, 2M LiCl catholyte.

FIG. 10 illustrates performance of a Li/Air cell having pressed pellets of $NH_4Cl$ salt mixed with alumina powder and Whatman micro fiber filters GF/A as second reservoir layers filled with 4M $NH_4Cl$, 2M LiCl catholyte.

Example 9

Figure 11:
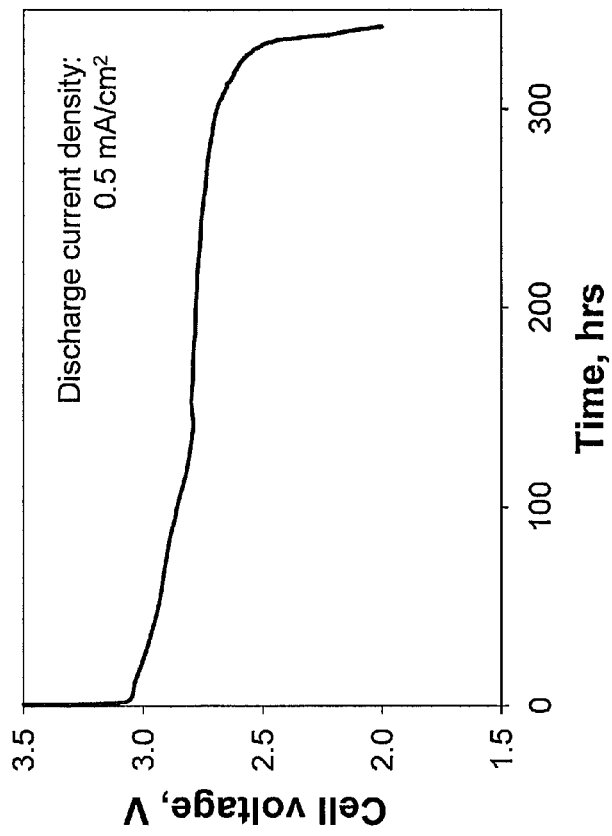
FIG. 11 illustrates performance of a Li/Air cell having crosslinked polyacrylamide hydrogel reservoir layers containing dissolved 4M $NH_4Cl$ and 2M LiCl.

FIG. 11 illustrates performance of a Li/Air cell having crosslinked polyacrylamide hydrogel reservoir layers containing dissolved 4M $NH_4Cl$ and 2M LiCl.

Example 10

Figure 12:
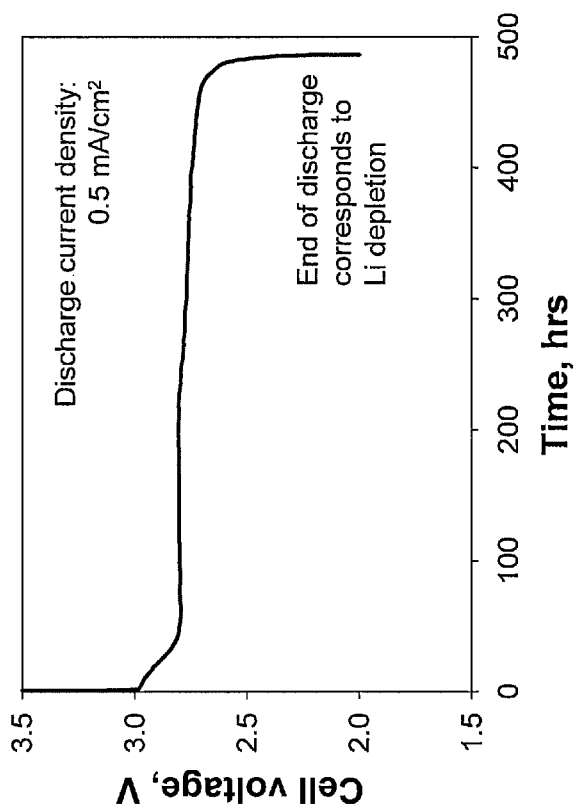
FIG. 12 illustrates performance of a Li/Air cell having crosslinked polyacrylamide hydrogel reservoir layers containing dissolved 2M LiCl and loaded with solid $NH_4Cl$.

FIG. 12 illustrates performance of a Li/Air cell having crosslinked polyacrylamide hydrogel reservoir layers containing dissolved 2M LiCl and loaded with solid $NH_4Cl$.

Alternative Embodiments

While the invention is described primarily in terms of Li and Li alloys anodes, other alkali metal anodes, in particular sodium (Na) may also be used in alternative embodiments. In such an alternative embodiment, the protective membrane architecture on the anode is configured for high ionic conductivity of the alkali metal ions of the anode material. For example, a protective membrane architecture for a Na metal anode may include a solid electrolyte layer composed of Nasicon.

CONCLUSION

Although the foregoing invention has been described in some detail for purposes of clarity of understanding, it will be apparent that certain changes and modifications may be practiced within the scope of the invention. It should be noted that there are many alternative ways of implementing both the devices and methods of the present invention. Accordingly, the present embodiments are to be considered as illustrative and not restrictive, and the invention is not to be limited to the details given herein. The following sample claims recite some non-exhaustive aspects of the invention to be claimed.

The invention claimed is:

1. A battery cell, comprising:
a protected anode, comprising,
  a lithium anode having a first surface and a second surface,
  a protective membrane architecture on at least the first surface of the anode,
a cathode compartment, prior to initial discharge, comprising:
  a cathode for reducing molecular oxygen;
  an aqueous catholyte comprising a dissolved portion of an active substance material; and
  an un-dissolved solid phase portion of the active substance material, in contact with the aqueous catholyte;
wherein the protective membrane architecture comprises one or more materials configured to provide a first membrane surface chemically compatible with the alkali metal anode in contact with the anode, and a second membrane surface substantially impervious to and chemically compatible with the components of the cathode compartment.

2. The cell of claim 1, wherein the un-dissolved solid phase portion of the active substance material is a solid phase active salt.

3. The cell of claim 2, wherein said solid phase active salt in contact with the catholyte operably dissolves therein.

4. The cell of claim 2, wherein the operable dissolution of the solid phase active salt in the catholyte generates dissolved active solute species that participate, as a reagent, in the cell reaction.

5. The cell of claim 2 wherein the solid phase active salt is hygroscopic.

6. The cell of claim 2 wherein the solid phase active salt is deliquescent.

7. The cell of claim 2, wherein the solid phase active salt comprises a halogen.

8. The cell of claim 2, wherein the solid phase active salt comprises nitrate.

9. The cell of claim 2, wherein the solid phase active salt comprises ammonium.

10. The cell of claim 2, wherein the solid phase active salt comprises a metal that is not lithium, and the solid substance operably dissolves hydrolytically in the water of the catholyte.

11. The cell of claim 10, wherein the solid phase active salt is a halide.

12. The cell of claim 11, wherein the halide is ammonium halide.

13. The cell of claim 10, wherein the solid phase active salt is a nitrate salt.

14. The cell of claim 10, wherein the solid phase active salt is a metal halide, wherein the metal of the halide is not lithium.

15. The cell of claim 10, wherein the solid phase active salt is selected from the group consisting of $NH_4Cl$, $NH_4Br$, $AlCl_3$, $NH_4NO_3$, $NH_4CNS$, $MgCl_2$.

16. The cell of claim 2, wherein the catholyte is saturated with the salt.

17. The cell of claim 2, wherein the salt is an active salt.

18. The battery cell of claim 17 wherein, prior to cell activation, the mole ratio of the solid phase active substance to active salt dissolved in the catholyte has a value selected from the group consisting of greater than 1, greater than 2, and greater than 10.

19. The battery cell of claim 17 wherein the mole ratio has a value within a range selected from the group consisting of from 2 to 3; from 3 to 4; from 4 to 5; from 5 to 6; from 6 to 7; from 7 to 8; from 8 to 9; and from 9 to 10.

20. The cell of claim 2, further comprising a non-active salt.

21. The cell of claim 20, wherein the non-active salt is a lithium salt.

22. The cell of claim 1, wherein the cathode compartment further comprises a reservoir disposed between the cathode and the protected anode.

23. The cell of claim 22, wherein the reservoir comprises a porous solid structure chemically compatible with the catholyte and chemically and electrochemically compatible with the cathode.

24. The cell of claim 23, wherein at least a portion of the surface or the pore structure of the porous solid structure is substantially covered or contains and/or in contact with the solid phase active substance.

25. The cell of claim 24, wherein the solid phase active substance is present or contained in at least a portion of the pore structure of the porous solid structure, the solid phase active substance in contact with the porous solid structure.

26. The cell of claim 22, wherein the cell is figured such that prior to initial activation of the cell the reservoir comprises solid phase active substance and substantially no catholyte, and the catholyte is formed in-situ upon activation.

27. The cell of claim 22, wherein the reservoir is substantially empty and the cell is figured such that the solid phase active substance is introduced into the reservoir after cell assembly or after cell assembly but prior to initial cell discharge.

28. The cell of claim 1, wherein the aqueous catholyte is substantially formed in-situ after exposure of the cathode compartment to ambient, whereby moisture from the ambient air enters the cathode compartment and dissolves the solid phase active substance to form aqueous catholyte.

29. The cell of claim 1 wherein, prior to exposing the cathode compartment to ambient air, the compartment further comprises a solid lithium supporting electrolyte salt.

30. The cell of claim 29, wherein the aqueous catholyte is substantially formed in-situ after exposure of the cathode compartment to ambient, whereby moisture from the ambient air enters the cathode compartment and dissolves the solid lithium supporting salt to form aqueous catholyte.

31. The cell of claim 1, wherein the solid phase active substance is in the form of a compact.

32. The cell of claim 31, wherein the solid phase active substance compact further comprises a second component material.

33. The cell of claim 32, wherein the second component material is an inorganic powder.

34. The cell of claim 33, wherein the inorganic powder is selected from the group consisting of silica, alumina and titania.

35. The cell of claim 31, wherein the compact is porous.

36. The cell of claim 35, wherein the pores of the compact contain catholyte.

37. The cell of claim 1, wherein the cathode compartment is open to air.

38. The cell of claim 1, wherein the solid phase active substance contacts the air cathode.

39. The cell of claim 1, wherein, prior cell activation, the compartment is substantially devoid of liquid water.

40. The cell of claim 39, wherein the active solid substance is microencapsulated.

41. The cell of claim 1, wherein the cathode compartment further comprises a hydrogel.

42. The cell of claim 1, wherein the cathode comprises a porous solid structure.

43. The battery cell of claim 1, wherein the solid phase active substance is incorporated in the cathode compartment during cell manufacture; and
   further wherein, subsequent to the start of initial discharge, at least a portion of the solid phase active substance remains in the cathode compartment as un-dissolved solid.

44. The battery cell of claim 43, further wherein an amount of the solid phase active substance remains in the cathode compartment as an un-dissolved solid subsequent to the cell delivering a percentage of its rated discharge capacity, said percentage selected from the group consisting of 25% or 50% or 75% or 90% of its rated discharge capacity.

45. The cell of claim 1, wherein the catholyte, prior to initial discharge, has an equilibrium relative humidity of less than 50%.

46. The cell of claim 1, wherein the catholyte, prior to initial discharge, has an equilibrium relative humidity of less than 30%.

47. The cell of claim 1, wherein the catholyte, prior to initial discharge, has an equilibrium relative humidity of less than 15%.

48. The cell of claim 1, wherein the protective membrane architecture comprises one or more lithium ion conducting oxide having a garnet like structure.

49. A method of making a battery cell comprising:
   providing,
      a protected anode, comprising,
         a lithium metal anode having a first surface and a second surface,
         a protective membrane architecture on at least the first surface of the anode,
      a cathode compartment comprising, prior to initial discharge, a cathode for reducing molecular oxygen, an aqueous catholyte, the catholyte comprising a dissolved portion of an active substance material, and an un-dissolved solid phase portion of the active substance material in contact with the aqueous catholyte; and, wherein the protective membrane architecture comprises one or more materials configured to provide a first membrane surface chemically compatible with the alkali metal anode in contact with the anode, and a second membrane surface substantially impervious to and chemically compatible with the components of the cathode compartment.

* * * * *